United States Patent
Takano et al.

(12) 
(10) Patent No.: US 6,400,887 B1
(45) Date of Patent: Jun. 4, 2002

(54) PORTABLE AV EDITING APPARATUS

(75) Inventors: Masayuki Takano, Tokyo; Yoshimori Horiuchi, Kanagawa; Ichitaro Sato, Kanagawa; Kazumasa Yamamura, Kanagawa; Noboru Yanagita, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/014,282

(22) Filed: Jan. 27, 1998

Related U.S. Application Data

(63) Continuation of application No. 08/624,555, filed as application No. PCT/JP95/01617 on Aug. 14, 1995, now Pat. No. 5,771,330.

(30) Foreign Application Priority Data

Aug. 12, 1994 (JP) .............................. 6-190748

(51) Int. Cl.⁷ ............................ H04N 5/76; H04N 5/783
(52) U.S. Cl. ........................................... 386/52; 386/55
(58) Field of Search ............................... 386/52, 55, 64, 386/65, 46, 109, 111, 112, 96, 107, 117, 120, 27, 33, 39, 4

(56) References Cited

U.S. PATENT DOCUMENTS

| | | | |
|---|---|---|---|
| 5,067,029 A | * | 11/1991 | Takahashi .................... 386/107 |
| 5,126,851 A | * | 6/1992 | Yoshimura et al. ........... 386/55 |
| 5,568,275 A | * | 10/1996 | Norton et al. ................. 386/52 |

FOREIGN PATENT DOCUMENTS

| | | |
|---|---|---|
| EP | 0 438 299 | 7/1991 |
| GB | 2 295 482 A | 5/1996 |
| WO | WO 90/0784 | 7/1990 |

* cited by examiner

*Primary Examiner*—Robert Chevalier
(74) *Attorney, Agent, or Firm*—Frommer Lawrence & Haug LLP; William S. Frommer; Bruno Polito

(57) ABSTRACT

An SDDI signal in accordance with an AV signal is selectively recorded in an MO disc 6 of a portable AV editing apparatus 1 from a hybrid recorder 20 provided with an on-line editing function. The user carries the portable AV editing apparatus 1 around separate from the hybrid recorder 20 and uses the SDDI signal recorded in the MO disc 6 to perform off-line editing and prepare an EDL (edit decision list). This EDL is transmitted from the field to the station. The EDL is used for on-line editing at the station.

40 Claims, 15 Drawing Sheets

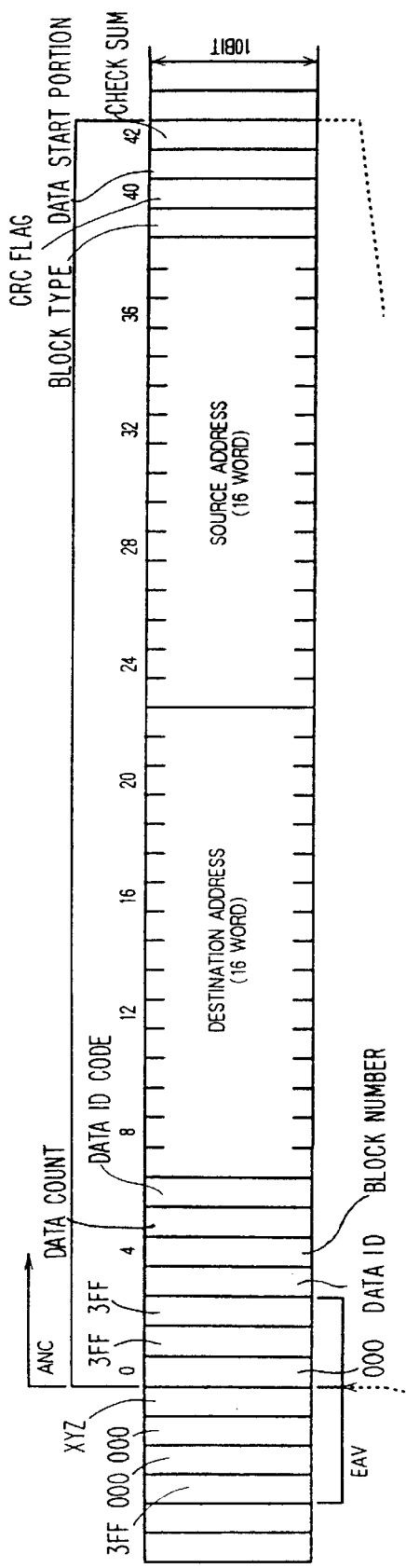
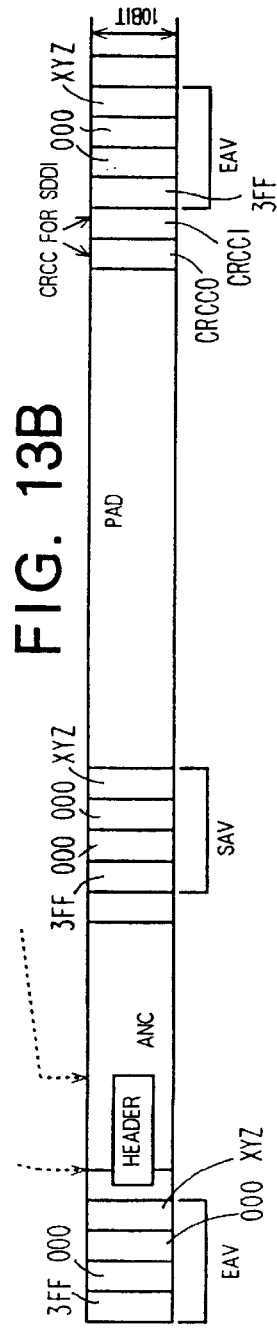
FIG. 13A
FIG. 13B

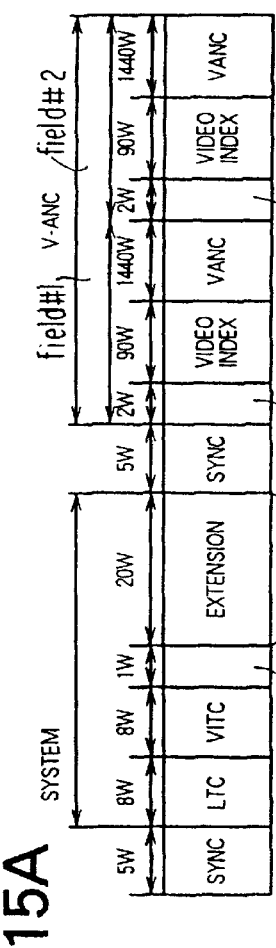
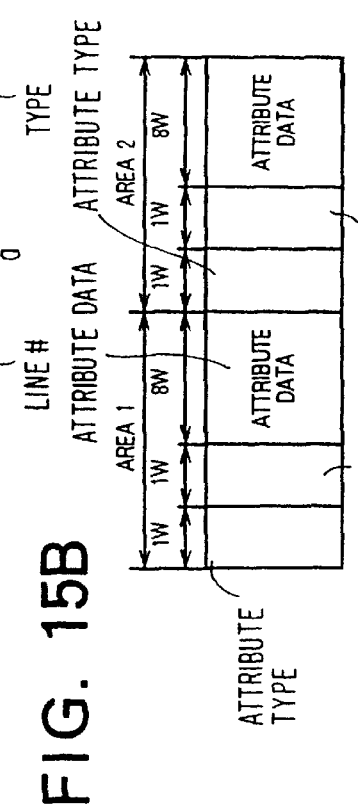
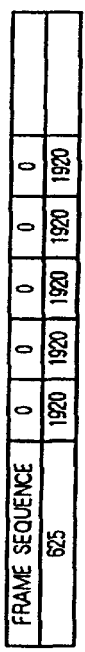
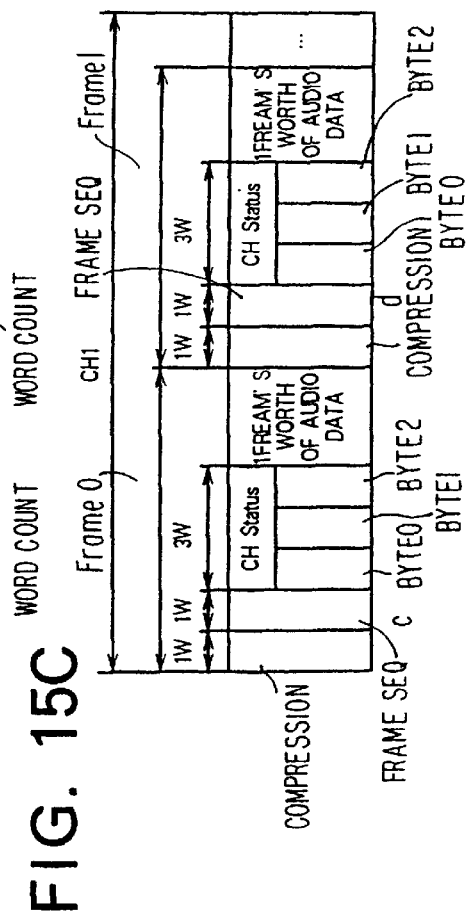
FIG. 15A
FIG. 15B
FIG. 15C
FIG. 15D
FIG. 15E

PORTABLE AV EDITING APPARATUS

This application is a continuation of application Ser. No. 08/624,555, filed Aug. 6, 1996, now U.S. Pat. No. 5,771,330 which is a 371 of PCT/JP95/01617, filed Aug. 14, 1995.

TECHNICAL FIELD

The present invention relates to a portable AV editing apparatus which can perform processing such as on-line editing and off-line editing.

BACKGROUND ART

Portions recorded at a studio or on location are recorded by scene or cut and contain no added special effects. Therefore, it is necessary to edit them to adjust them to an effective composition of images and sound and to a proper length. Video tape is edited by the electronic editing system of electrical dubbing. This electronic editing system includes on-line editing for editing by directly using a final recording medium and off-line editing for preparing the data for the on-line editing by using an inexpensive medium and apparatus. Conventionally, the user has performed the editing operation by using an editing apparatus designed for on-line editing when performing on-line editing and has performed the editing operation by using an editing apparatus designed for off-line editing when performing off-line editing.

However, in the conventional system, the above-mentioned editing apparatuses were not designed by taking portability into account. When a user performed processing for editing by using the editing apparatuses, there were limitations in terms of place and time.

DISCLOSURE OF INVENTION

An object of the present invention is to eliminate the above limitations and provide a portable AV editing apparatus which can perform processing for editing of an AV (audio visual) signal by a user without any limitations in terms of place and time.

According to the present invention, there is provided a portable AV editing apparatus accommodating an input means for inputting a video signal from an on-line editing apparatus, a disc recording means for recording the video signal on a disc type recording medium; a processing means; a display; an operation unit; and a power source in a portable case, wherein the processing means causes the video signal from an on-line editing apparatus to be recorded in the disc recording means when the input means is connected to the on-line editing apparatus and performs off-line editing in accordance with the operation of the operation unit based on a video signal preliminarily recorded in the disc recording means when the input means is not connected to the on-line editing apparatus.

The portable AV editing apparatus of the present invention preferably is one in which the video signal is a compressed video signal and the input means inputs a video signal selected from among the video signals recorded in the on-line editing apparatus in accordance with the necessary scene.

Alternatively, the portable AV editing apparatus of the present invention preferably is one wherein the video signal is selected by either of a manual mode using a search dial or by an automatic mode where it is automatically selected at predetermined time intervals.

The portable AV editing apparatus of the present invention is preferably one wherein the on-line editing is performed by showing on a display a first display portion showing, in stamp picture units, the video signal input from the on-line editing apparatus, a second display portion showing the first and final stamp pictures of a group of pictures composing a scene designated in accordance with the operation of the operation unit out of the stamp pictures shown in the first display portion, and a third display portion showing said programmed group of pictures when the stamp pictures shown at the second display portion are programmed by designation in accordance with the operation of the operation unit.

Further, the portable AV editing apparatus of the present invention is preferably one wherein the input means inputs the video signal in at least field units and said disc recording means records the video signal in at least field units.

Further, the portable AV editing apparatus of the present invention is preferably one wherein said disc type recording medium is a magneto-optic disc.

Further, the portable AV editing apparatus of the present invention is preferably one wherein the video signal includes an audio signal.

BRIEF DESCRIPTION OF DRAWINGS

The above object and features of the present invention and other objects and features will become more apparent from the following description made with reference to the attached drawings, in which:

FIG. 13A is a view of the configuration of the header data included in the ancillary data portion ANC of the transmission packet of the SDDI system shown in FIG. 12A, FIG. 12B, and FIG. 12C;

FIG. 13B shows the position where the header is placed in the ancillary data portion ANC of the transmission packet of the SDDI system shown in FIG. 12A, FIG. 12B, and FIG. 12C;

FIG. 15A is a view of the data included in the portions a and b of the payload portion shown in FIG. 14;

FIG. 15B is a view of the data included in the portion a (EXTENSION) shown in FIG. 15A;

FIG. 15C is a view of the data included in the portion c shown in FIG. 14;

FIG. 15D is a view of the content of the data included in the portion c (Frame. Seq.) of FIG. 15C; and FIG. 15E is a view of the content of the data included in the portion d (Frame. Seq.) of FIG. 15C.

BEST MODE FOR CARRYING OUT THE INVENTION

Below, an explanation will be made of a portable AV editing apparatus according to an embodiment of the present invention.

Figure 1:
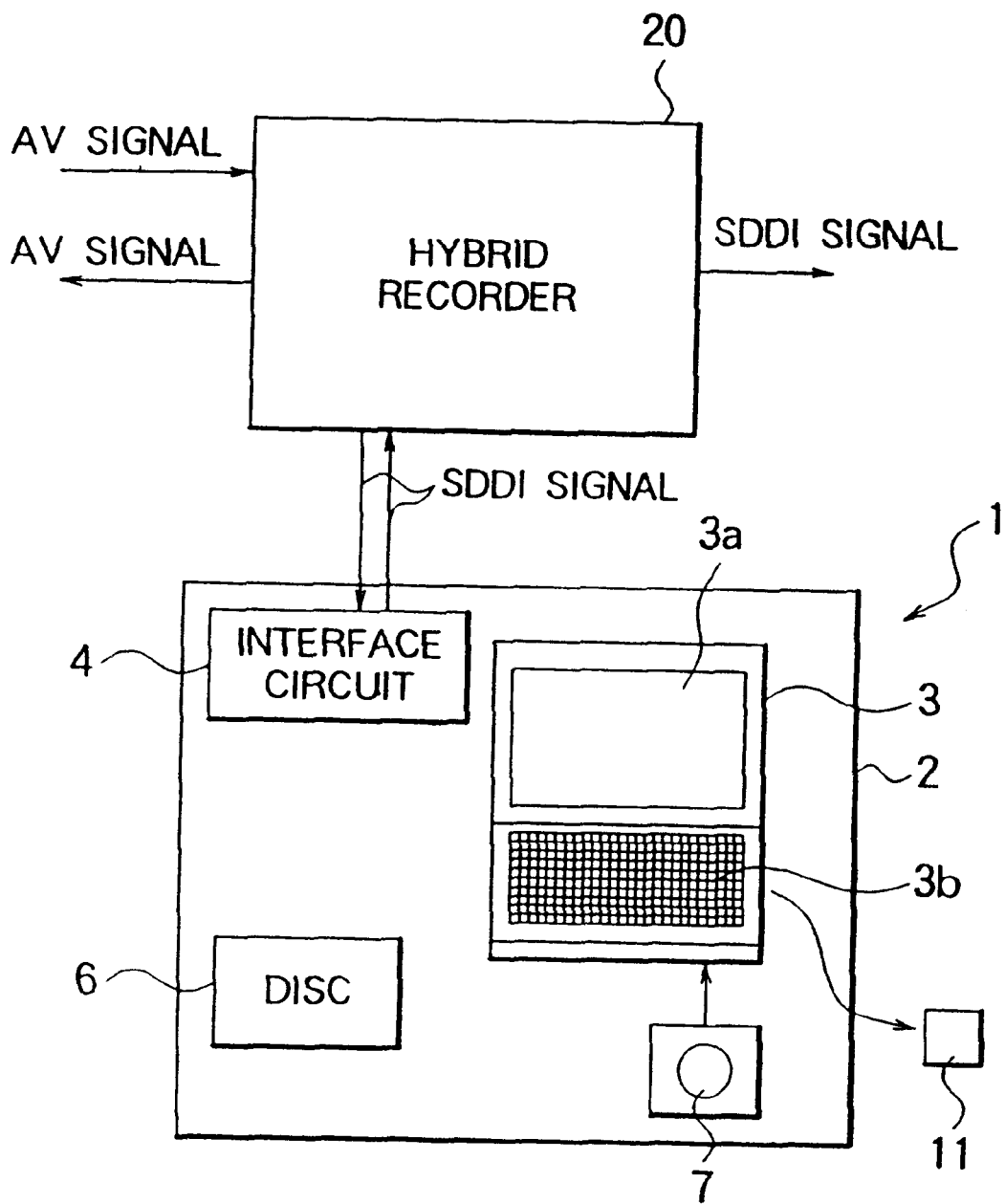
FIG. 1 is a view for explaining a portable AV editing apparatus and hybrid recorder according to an embodiment of the present invention.

FIG. 1 is a view for explaining a portable AV editing apparatus 1 according to the present embodiment.

As shown in FIG. 1, the portable AV editing apparatus 1 and hybrid recorder 20 send and receive SDDI (serial digital data interface) signals by the SDDI system when connected to each other on-line. The SDDI system is a system of transmission having a high compatibility with the SDI (serial digital interface) system, standardized as SMPTE-259M of the SMPTE (Society of Motion Picture and Television Engineering) while being more suited to multimedia and multichannels than the SDI system. The format of an SDDI signal will be discussed later.

The hybrid recorder 20 is for example placed at the field away from the broadcasting station, receives as input an AV signal from an outside apparatus, and transmits an SDDI signal to the broadcasting station.

The portable AV editing apparatus 1 is provided with an interface circuit 4, a disc 6, and a search dial 7 in an attache case 2 and accommodates a personal computer 3. The interface circuit 4 includes various types of processing circuits such as interface circuits.

First, an explanation will be made of the hybrid recorder 20 shown in FIG. 1.

Figure 2:
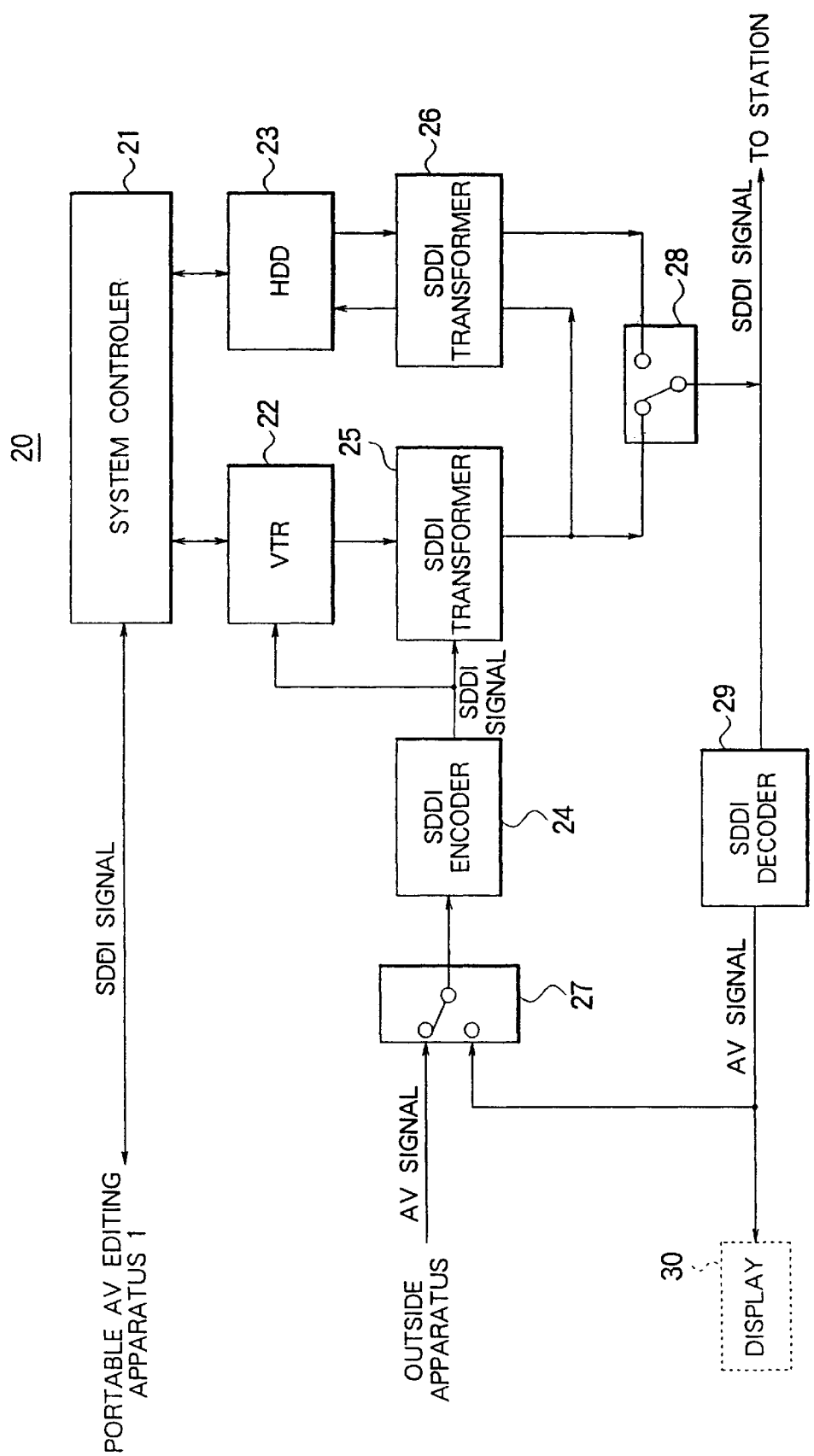
FIG. 2 is a view of the configuration of the hybrid recorder shown in FIG. 1.

FIG. 2 is a view of the configuration of the hybrid recorder 20 shown in FIG. 1.

As shown in FIG. 2, the hybrid recorder 20 includes a system controller 21, a VTR 22, a hard disc 23, an SDDI encoder 24, SDDI transformers 25 and 26, changeover switches 27 and 28, and an SDDI decoder 29.

The system controller 21 controls the input and output of the SDDI signal between the VTR 22 and hard disc 23 and the portable editing apparatus 1 when the portable AV editing apparatus 1 and the hybrid recorder 20 are connected on-line.

The changeover switch 27 receives as input the AV signal from the outside apparatus and the AV signal from the SDDI decoder 29 and selectively outputs these to the SDDI encoder 24.

The SDDI encoder 24 encodes the AV signal input from the changeover switch 27 to produce an SDDI signal, then outputs this SDDI signal to the VTR 22 and the SDDI transformers 25 and 26.

The changeover switch 28 selectively outputs the SDDI signal from the SDDI transformers 25 and 26 to the SDDI decoder 29. The SDDI signal from the changeover switch 28 is for example transmitted off-line to the broadcasting station through a transmitter etc. By transmitting the SDDI signal to the broadcasting station in this way, it is possible to transmit data such as the time code which could not be transmitted when using an AV signal.

The SDDI decoder 29 decodes the SDDI signal input from the changeover switch 28 to produce an AV signal and outputs the AV signal to the display 30 and the changeover switch 27.

As shown in FIG. 2, the hybrid recorder 20 is provided with a VTR 22 for recording and reproducing an AV signal to and from a video tape and a hard disc 23 for editing the reproduced signal. The hard disc 23 is for example a recording medium such as a magnetic disc or optical disc and enables random high speed access to the source and acquisition of a high editing efficiency. The hybrid recorder 20 is provided with the functions for on-line editing, has a relatively large size, and lacks portability.

Further, with the hybrid recorder 20 shown in FIG. 2, when for example outputting an SDDI signal from the VTR 22 to the hard disc 23, the SDDI signal from the VTR 22 is output to the hard disc 23 successively through the changeover switch 28, SDDI decoder 29, changeover switch 27, SDDI encoder 24, and SDDI transformers 25 and 26.

Next, an explanation will be made of the portable AV editing apparatus 1 shown in FIG. 1.

Figure 3:
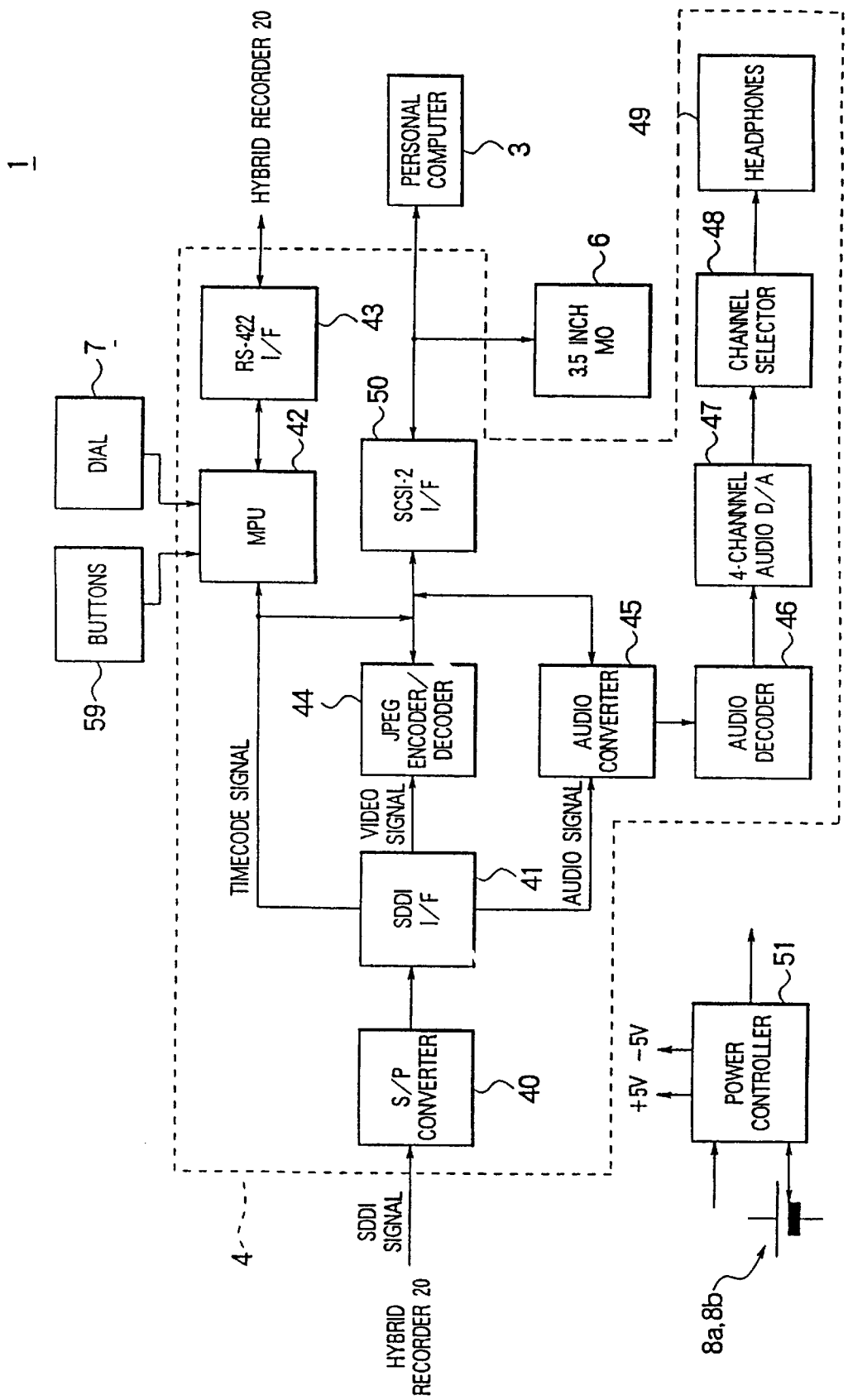
FIG. 3 is a view of the configuration of the portable AV editing apparatus shown in FIG. 1.

FIG. 3 is a view of the configuration of the portable AV editing apparatus 1 shown in FIG. 1.

As shown in FIG. 3, the portable AV editing apparatus 1 includes a search dial 7, batteries 8a and 8b, buttons 59, S/P (serial/parallel) converter 40, SDDI interface 41, MPU (microprocessor unit) 42, interfaces 43 and 50, JPEG encoder/decoder 44, audio converter 45, audio decoder 46, 4-channel audio D/A converter 47, channel selector 48, headphones 49, and power controller 51.

The disc 6, for example, is a random access type storage device such as a 3.5 inch MO (magneto-optical recording) disc or other optical disc or hard disc. The disc 6 for example has a storage capacity of about 600 Mbyte. The disc 6 stores the AV signal in for example frame units and has the video signal and audio signal recorded in correspondence with each other.

The AV signal recorded on the disc 6 is compressed by a predetermined data compression rate of for example 1/100 so as to become about one hour in length. That is, when editing, since there is no need for displaying a high quality image on the display 3a of the personal computer 3, it is made possible to record as long an AV signal as possible by compressing the AV signal and recording it on the MO disc 6.

The search dial 7 is used for example for bringing the VTR 22 to the start when connecting the portable AV editing apparatus 1 and the hybrid recorder 20 for on-line recording.

The MPU 42 controls the operation of the components in the portable AV editing apparatus 1 based on a prestored predetermined microprogram in accordance with the user's operation of the search dial 7 and the buttons 59. Further, the MPU 42 receives as input a time code signal from the SDDI interface 41 and outputs this time code signal through the interface 43 to the hybrid recorder 20.

As the interface 43, use is made for example of an RS-422.

The S/P converter 40 receives as input from the system controller 21 of the hybrid recorder 20 a serial format SDDI signal in for example field units and converts the same to a parallel format SDDI signal for output to the SDDI interface 41 when the portable AV editing apparatus 1 and the hybrid recorder 20 are connected on-line.

The SDDI interface 41 separates the parallel format SDDI signal from the S/P converter 40 and outputs the time code signal, video signal, and audio signal to the MPU 42, JPEG encoder/decoder 44, and audio converter 45.

The JPEG encoder/decoder 44 has the function of encoding and decoding the video signal.

The audio converter 45 converts the audio signal input from the SDDI interface 41 and outputs the converted audio signal to the audio decoder 46 and interface 50. AB the interface 50, use is made for example of an SCSI (small computer system interface)-2. The interface 50 is connected with the personal computer 3 and the 3.5 inch MO disc 6.

The audio decoder 46 decodes the audio signal input from the audio converter 45 and outputs it to the 4-channel audio D/A converter 47.

The 4-channel audio D/A converter 47 is provided with four channels and converts the digital format audio signal input from the audio decoder 46 to an analog type audio signal.

The channel selector 48 selects one channel from the four channels of the 4-channel audio D/A converter 47 and outputs the audio signal from the selected channel to the headphones 49.

The power controller 51 supplies power from the batteries 8a and 8b to the components in the portable AV editing apparatus 1.

Figure 4A:
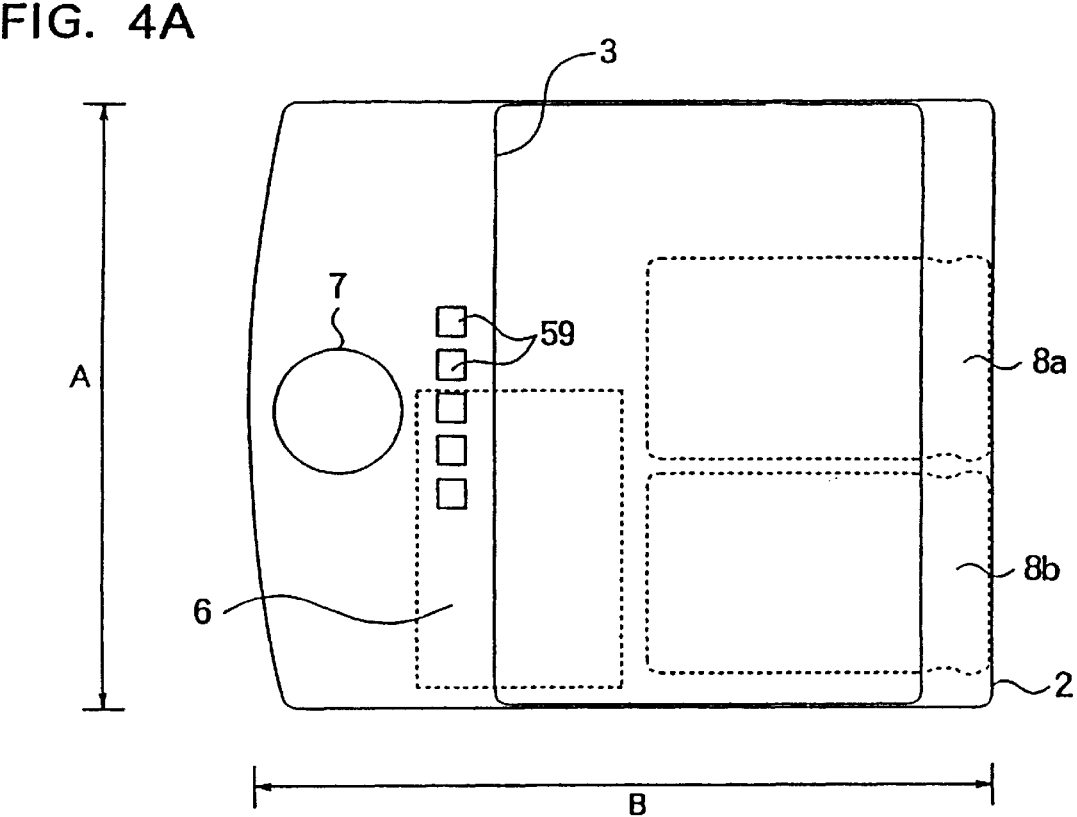
FIG. 4A is a plan view of an attache case according to an embodiment of the present invention.
Figure 4B:
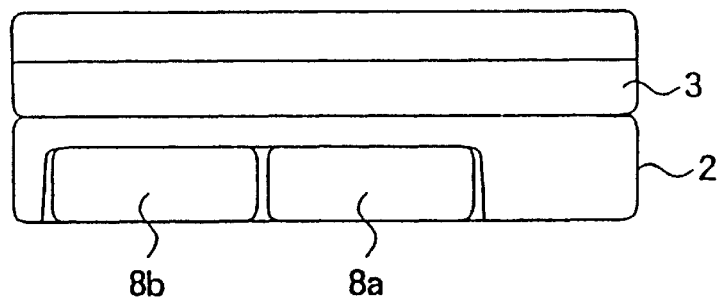
FIG. 4B is a front view of the attache case according to an embodiment of the present invention.

FIG. 4A is a plan view of the attache case 2; FIG. 4B is a front view of the attache case 2; and FIG. 4C is a side view of the attache case 2.

Figure 4C:
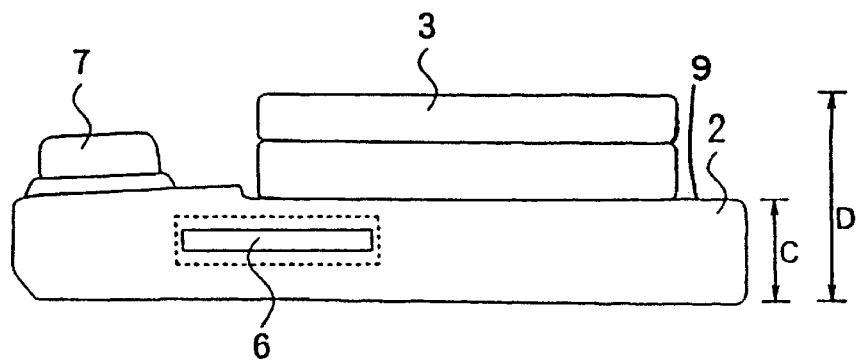
FIG. 4C is a side view of the attache case according to an embodiment of the present invention.

As shown in FIG. 4A, FIG. 4B, and FIG. 4C, a disc 6 and batteries 8a and 8b are arranged near a bottom portion of the attache case 2. The batteries 8a and 8b drive the components including the personal computer 3. As the batteries 8a and 8b, for example, lithium-ion batteries are used. At a position away from the bottom portion by a height C, a plate 9 is provided. On the plate 9 there are arranged the personal computer 3, the search dial 7, the buttons 59, etc.

The attache case 2 has a vertical (A)×horizontal (B) size of for example 290 mm×390 mm, a height (C) from the bottom portion to the plate 9 of 60mm, and a thickness (D) of 125mm. Also, the total sum of the weights of the portable AV editing apparatus 1 and the attache case 2 is about 5 kg. For this reason, the attache case 2 accommodating the portable AV editing apparatus 1 is excellent in its portability.

As the personal computer 3, for example, a commercially available personal computer is used.

Below, an explanation will be made of a case where the editing is carried out by using the portable AV editing apparatus 1 shown in FIGS. 1 to 4.

First, an explanation will be made of a case where the on-line editing is carried out.

Figure 5A:
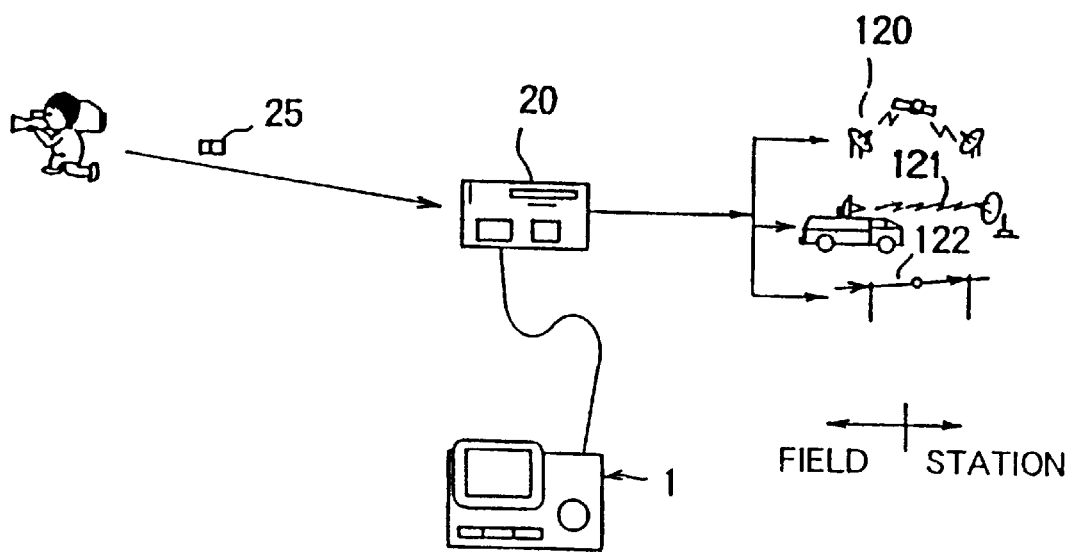
FIG. 5A is a conceptual view of where on-line editing is carried out by using a portable AV editing apparatus shown in FIG. 1.

FIG. 5A is a conceptual view of the case where the on-line editing is carried out by using the portable AV editing apparatus 1 shown in FIG. 1.

The video tape 25 shot by a video camera or the like is loaded into the hybrid recorder 20.

The on-line editing is carried out in a state where the hybrid recorder 20 is connected to the interface circuit 4.

Namely, the AV signal from the hybrid recorder 20 is transmitted to the portable AV editing apparatus 1 by the SDDI system, then the AV signal is output to the personal computer 3. The user performs the editing operation while viewing the picture shown on the display 3a of the personal computer 3. Editing data in accordance with this operation is output to the hybrid recorder 20. The user can find the head of the video tape by using for example the search dial 7 in the editing operation.

The hybrid recorder 20 transmits the edited data input from the portable AV editing apparatus 1 from the field to the broadcasting station through an SNG (satellite news gathering) system 120, RF (radio frequency) communication system 121, or telephone lines 122 using a modem.

Next, an explanation will be made of a case where the off-line editing is carried out.

Figure 5B:
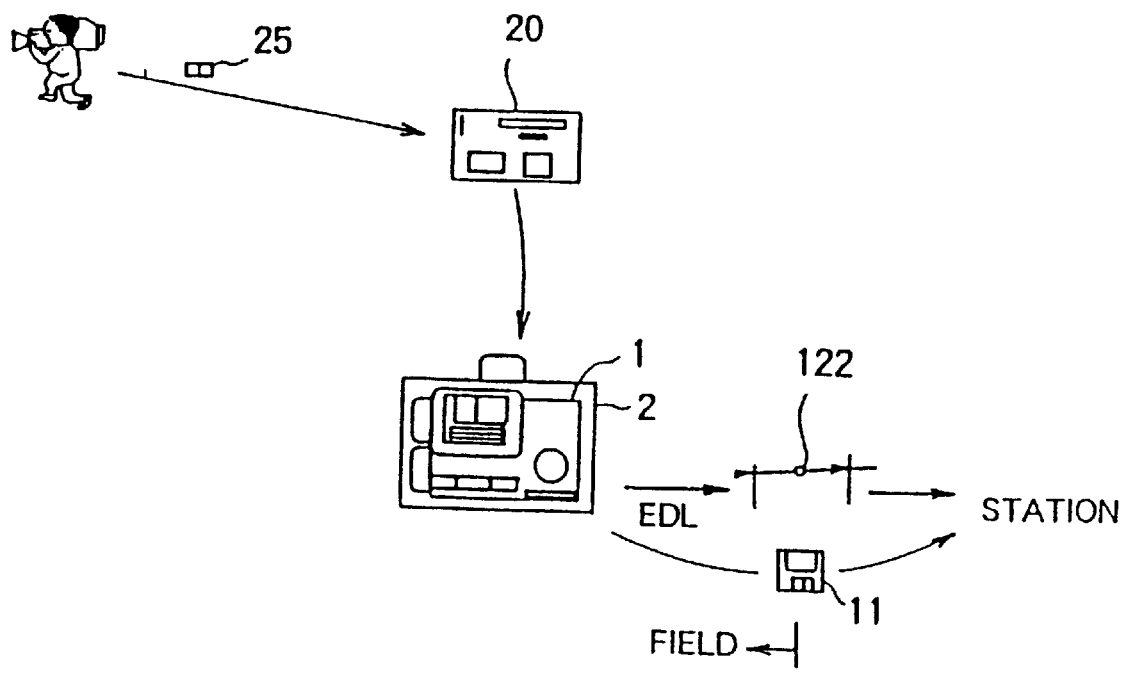
FIG. 5B is a conceptual view of where off-line editing is carried out by using a portable AV editing apparatus shown in FIG. 1.

FIG. 5B is a conceptual view of the case where the off-line editing is carried out by using the portable AV editing apparatus 1 shown in FIG. 1.

The video tape 25 which is shot is loaded into the hybrid recorder 20, where the off-line editing is carried out, the AV signal is preliminarily transferred from the hybrid recorder 20 to the disc 6 of the portable AV editing apparatus 1 for storage.

After the AV signal is stored in the disc 6, with the hybrid recorder 20 and the interface circuit 4 disconnected, the AV signal stored in the disc 6 is read by the personal computer 3 and the image is shown on the display 3a. The user views the image shown on the display 3a and operates the keyboard 3b of the personal computer 3 to prepare an EDL (edit decision line). This EDL is stored in a floppy disc 11.

Namely, since the portable AV editing apparatus 1 has been accommodated in the attache case 2, after the AV signal is stored in the disc 6, the user can move about while carrying the attache case 2 and therefore perform the off-line editing and prepare the EDL without any limitation in terms of time and place. In this off-line editing, it is also possible to perform processing to simultaneously display for example a plurality of pictures based on AV signals on the display 3a of the personal computer 3 in units of frames and enable a user to click and specify a necessary frame by using for example a mouse.

The EDL prepared by the off-line editing is transmitted via the telephone line 122 to the broadcasting station or stored in the floppy disk 11 and then conveyed to the broadcasting station.

Then, the EDL prepared in the off-line editing is input to the on-line editing apparatus equipped in the broadcasting station, and the on-line editing is carried out based on such an EDL.

If the off-line editing is carried out in this way, and then the on-line editing is carried out based on the already prepared EDL, it is not necessary to perform the operation by using an expensive on-line editing apparatus for a long time, which is preferable in terms of economy.

As mentioned above, according to the portable AV editing apparatus 1 of the present embodiment, the on-line editing can be carried out by connecting the interface circuit 4 and the hybrid recorder 20 and, at the same time, the off-line editing can be carried out apart from the hybrid recorder 20.

Further, the portable AV editing apparatus 1 has portability in terms of the size and weight and is provided with its own batteries 8a and 8b, and therefore the user can perform the off-line editing by using the portable AV editing apparatus 1 without any limitation in terms of time and place.

Below, an explanation will be made of the specific processing and operation at the portable AV editing apparatus 1 and hybrid recorder 20 shown in FIG. 1 to FIG. 3.

First, an explanation will be made of the concept of the processing at the portable AV editing apparatus 1 and the hybrid recorder 20.

Figure 6:
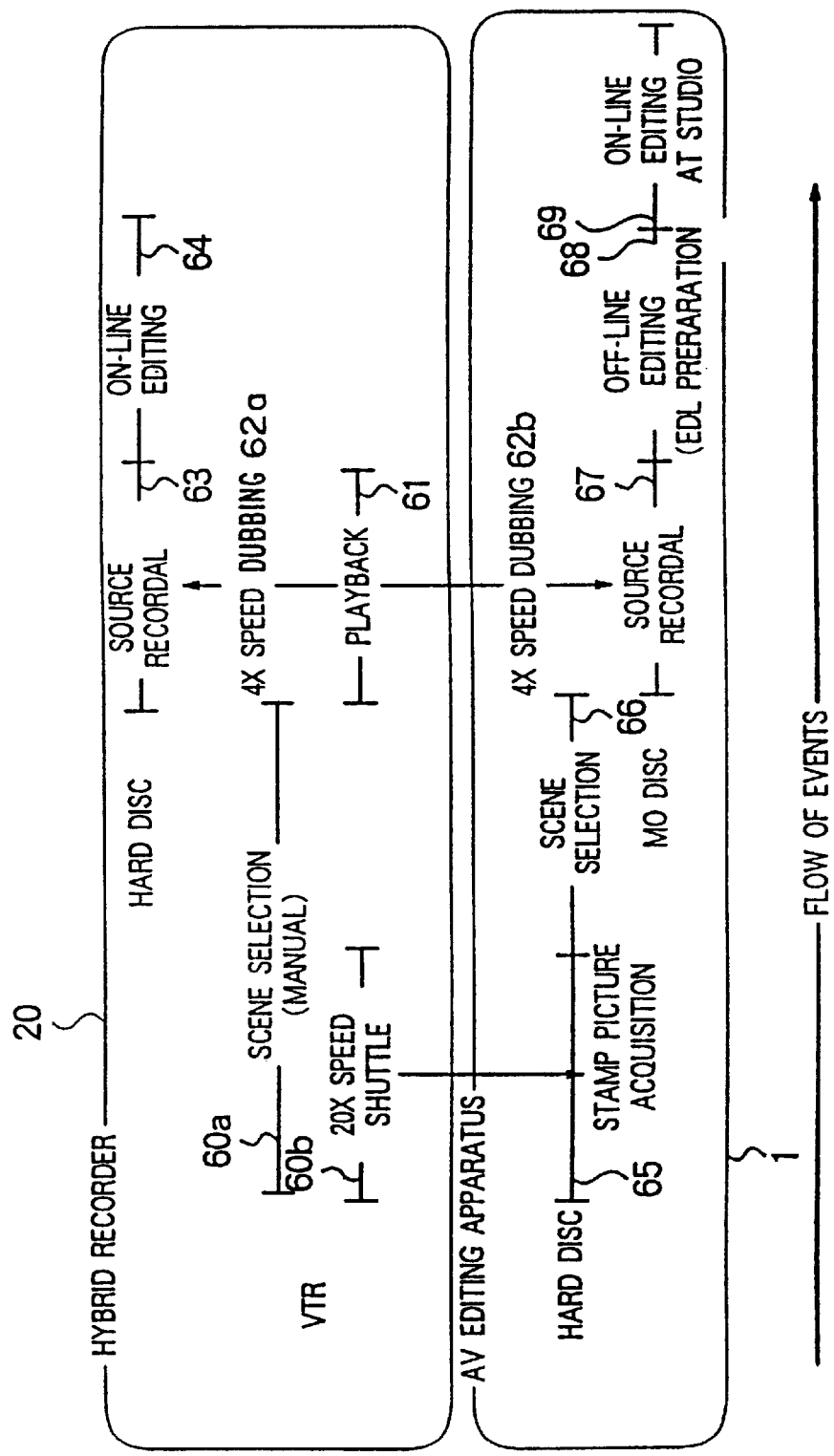
FIG. 6 is a conceptual view of the flow of events in the portable AV editing apparatus and hybrid recorder shown in FIG. 1.

FIG. 6 is a conceptual view of the flow of events in the portable AV editing apparatus 1 and hybrid recorder 20. The events are executed in order from left to right in the figure as shown by the arrow.

First, as shown in FIG. 6, in the hybrid recorder 20, the mode of the scene selector 60a where the user manually operates the search dial 7 for example to select a stamp picture or the mode of the 20× speed shuttle 60b for causing the VTR to run at 20× normal speed for automatic selection of stamp pictures is selected for the VTR 22 in which the source is recorded in accordance with an instruction from the user.

If the mode of the 20× speed shuttle 60B is selected, the portable AV editing apparatus 1 acquires (records) a stamp picture from the hybrid recorder 20 every 5to 10 seconds on the hard disc of the personal computer 3. The stamp pictures recorded on the hard disc of the personal computer 3 are used for the scene selection 66. The scene selection 66 is performed by the user selecting the necessary scene using a GUI (graphical user interface). Here, a scene is comprised by a series of stamp pictures. When the scene selection 66 ends, the portable AV editing apparatus 1 performs source recordal 67 for recording the source produced by the scene selection 66 from the hard disc of the personal computer 3 to the MO disc 6.

On the other hand, when the scene selection 60a is performed, playback 61 is performed at the hybrid recorder 20 and source recordal 63 for recording the source produced by the scene selection 60a on the hard disc 23 of the hybrid recorder 20 by 4× speed dubbing and source recordal 67 for recording source produced by the scene selection 60a are simultaneously performed.

After the source recordal 63 is performed in the hybrid recorder 20, on-line editing 64 is performed.

On the other hand, when the source recordal 67 is performed at the portable AV editing apparatus 1, off-line editing 68 is performed for preparing the EDL. The EDL produced by the off-line editing 68 is for example sent to the studio where the EDL is used for on-line editing at the studio.

Next, an explanation will be made of the picture of the GUI shown on the display 3a of the personal computer 3 when performing on-line editing and off-line editing.

Figure 7:
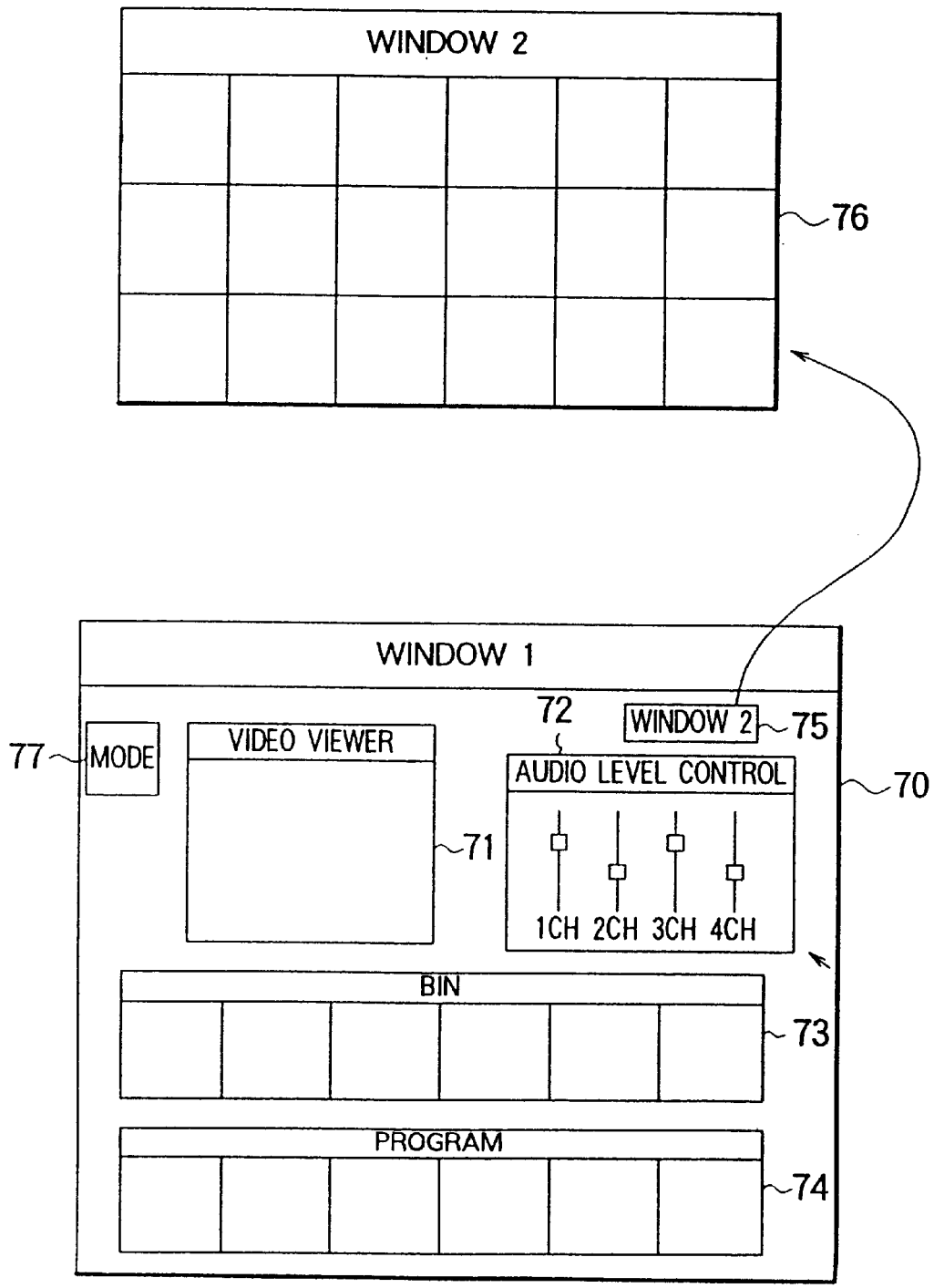
FIG. 7 shows the screen of GUI displayed on a display of a personal computer shown in FIG. 1 in on-line editing or off-line editing.

FIG. 7 shows the screen of the GUI displayed on a display 3a of the personal computer 3 shown in FIG. 1 in on-line editing or off-line editing.

As shown in FIG. 7, in the picture of the GUI shown in the display 3a is shown for example the "Window 1" 70. In the picture of the "Window 1" 70 is shown the "Video Viewer" window 71 which shows the video when for example showing a preview, an "Audio Level Control" window 72 for adjusting the audio level, a "Bin" window 73, a "Program" window 74, a mode designation icon 77, and a "Window 2" icon 75.

The user can display the "Window 2" 76 on the display 3a by designating the icon 75 by clicking on it with a mouse etc.

Further, the user can call up the plurality of mode setting displays provided under the icon 77 on the display 3a by designating the icon 77 by clicking on it with a mouse etc.

Further, the stamp pictures for the video for the SDDI signal are displayed in the areas of the "Window 2" 76, the "Bin" window 73, and the "Program" window 74.

Next, an explanation will be given of the processing for selection of a scene using the portable AV editing apparatus 1.

Figure 8:
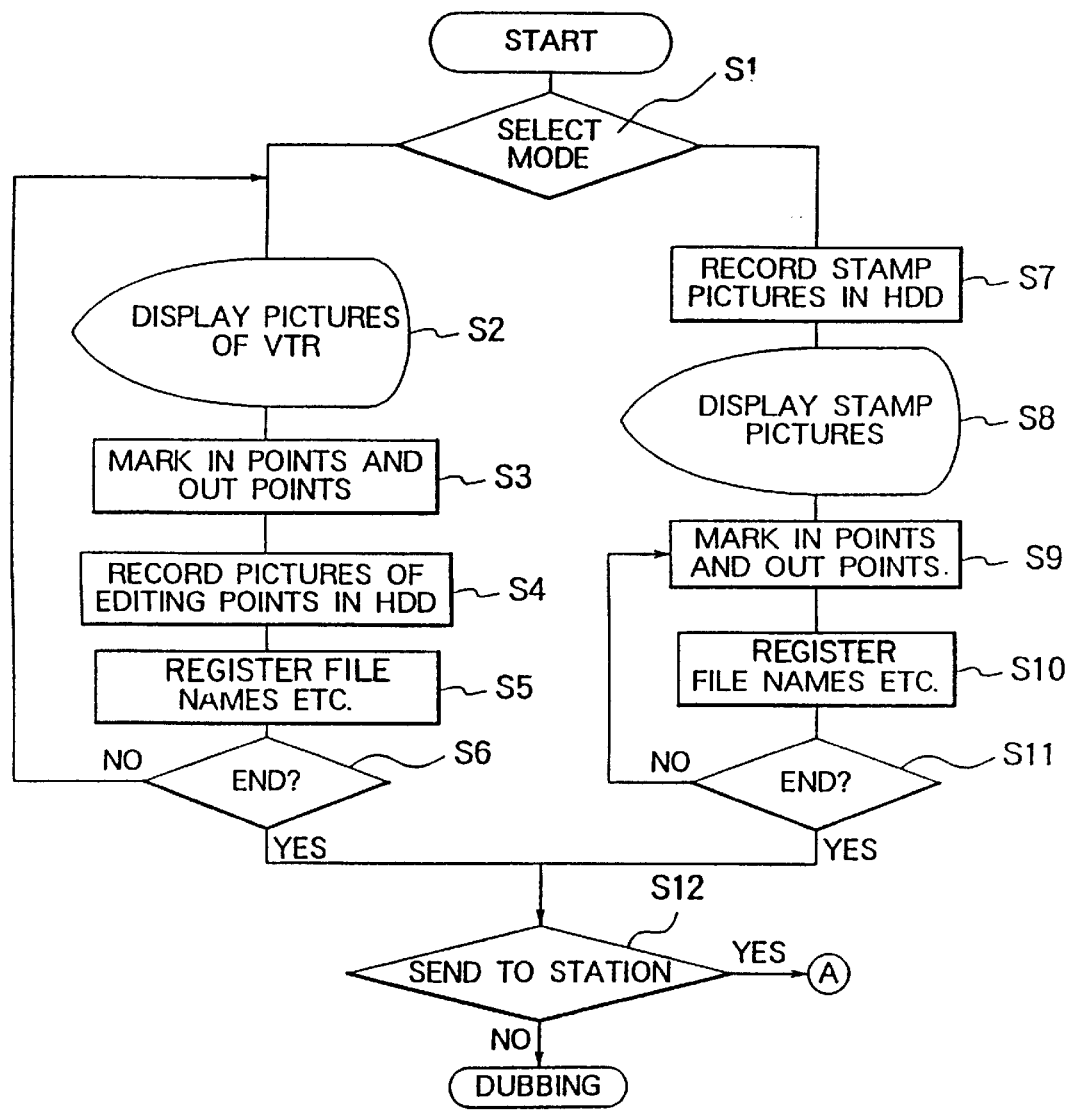
FIG. 8 is a flow chart of the processing for selection of a scene in an embodiment of the present invention.

FIG. 8 is a flow chart of the processing for selection of a scene using the portable AV editing apparatus 1.

Step S1: For example, as shown in FIG. 1, the user performs operations on the picture of the GUI shown in FIG. 7 using a mouse etc. in the state with the portable AV editing apparatus 1 and the hybrid recorder 20 connected on-line so as to select either of the manual search mode or the shuttle mode. The mode designation display is located for example under the icon 77 of the "Window 1" 70 shown in FIG. 7.

Step S2: This is executed when the manual search mode has been selected at step S1. The picture of the source recorded on the VTR 22 of the hybrid recorder 20 is shown on the display 3a of the personal computer 3, for example, in accordance with the manual operation of the search dial 7 by the user.

Step S3: The user views the display on the display 3a and marks (records) the IN points and OUT points for the necessary stamp pictures for each scene. Here, the IN point and OUT point are information specifying the first stamp picture and last stamp picture of the scene requiring editing.

Step S4: The stamp pictures of the IN points and the OUT points marked at step S3 are for example recorded on a hard disc housed in the personal computer 3 for example.

Step S5: The file name for the scene marked by the IN points and OUT points at step S3 and the reel number showing the identification number of the VTR tape on which the scene is recorded are registered.

Step S6: It is judged if the processing of the manual search mode has been completed or not. If completed, the processing of step S12 is executed, while if not, the processing of step S2 is executed again. That is, the processing of step S2 to S6 is repeated until the manual search of all the scenes necessary for the editing has been completed.

The processing of step S2 to S6 corresponds to the scene selection 60a shown in FIG. 6.

Step S7: This is executed when the shuttle mode is selected. The processing in this shuttle mode corresponds to the 20× speed shuttle 60b, the stamp picture acquisition 65, and the scene selection 66 shown in FIG. 6. At step S7, the stamp pictures are produced at 5 to 10 second intervals while reproducing the VTR 22, at 20× speed and the thus produced stamp pictures are recorded on the hard disc of the personal computer 3.

Step S8: The stamp pictures recorded at step S7 are shown on the display 3a of the personal computer 3.

The processing of step S7 and 8 corresponds to the 20× speed shuttle 60b and the stamp picture acquisition 65 shown in FIG. 6.

Step S9: The display of the display 3a is viewed by the user and the IN points or OUT points of the required stamp pictures are marked (recorded) for each scene.

Step S10: The file name of the scene marked by the IN point or OUT point at step S9 and the reel number showing the identification number of the. VTR tape on which the scene is recorded are registered.

Step S11: It is judged if the processing of the shuttle mode has been completed or not. If completed, the processing of step S12 is executed, while if not, the processing of step S9 is executed again. That is, the processing of step S9 to S11 is repeated until all the scenes necessary for the editing have been selected.

The processing of step S9 to S11 corresponds to the scene selection 66 shown in FIG. 6.

Step S12: It is judged if the scene selected by the manual search mode or the shuttle mode is to be directly transmitted to the broadcasting station or not. When to be directly transmitted, the processing shifts to the position of "A" shown in FIG. 11, discussed later. On the other hand, when not to be directly transmitted to the broadcasting station, the dubbing processing shown in the later mentioned FIG. 9 is executed.

Next, an explanation will be given of the processing for dubbing using the portable AV editing apparatus 1.

Figure 9:
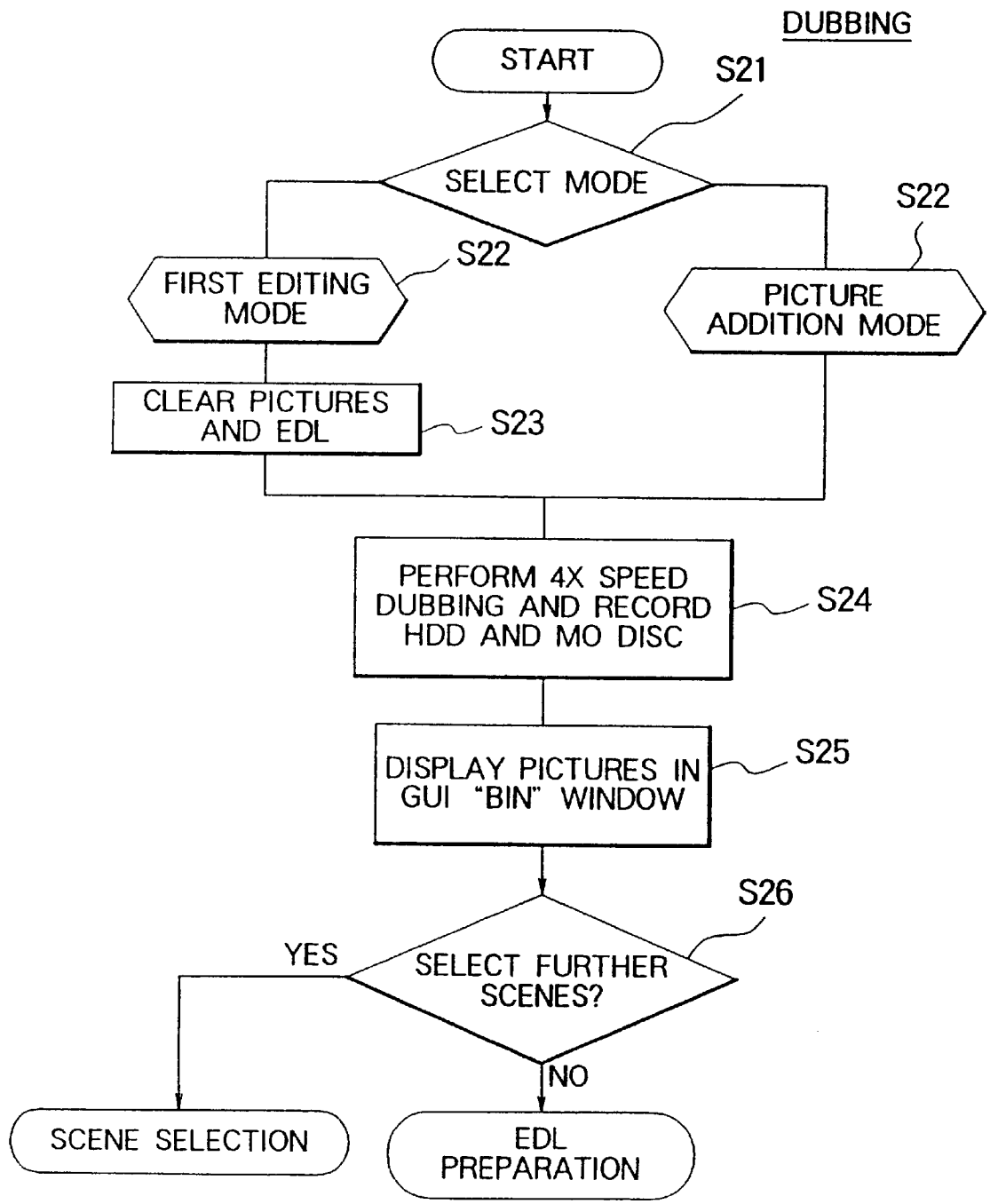
FIG. 9 is a flow chart of the processing for dubbing in an embodiment of the present invention.

FIG. 9 is a flow chart of the processing for dubbing in processing for editing.

The dubbing processing shown in FIG. 9 is processing corresponding to the playback 61, 4× speed dubbing 62a and 62b, and source recording 63 and 67 shown in FIG. 6.

Step S21: For example, the user selects one of the first editing mode or the stamp picture addition mode by performing a specific operation on the GUI picture shown in FIG. 7 using a mouse etc. Here, the first editing mode is selected when the processing of step S21 is to be executed first. The mode designation display is located under the icon 77 of the "Window 1", 70 shown in FIG. 7 for example. The stamp picture addition mode is executed when the scene selection processing was performed two or more times in the previous flow of processing. At step S27, processing is performed to add the group of stamp pictures prepared in the previous scene selection to the existing group of stamp pictures.

Step S22: This is executed when the first editing mode is selected at step S21.

Step S23: The existing group of stamp pictures and EDL are cleared.

Step S24: 4× speed dubbing is performed and the group of stamp pictures from the VTR 22 is recorded on the MO disc 6 of the portable AV editing apparatus 1 and the hard disc 23 of the hybrid recorder 20.

Step S25: The group of stamp pictures is made to be displayed in the "Bin" window 73 shown in FIG. 7.

Step S26: Further, it is judged if scene selection is to be performed. If it is judged it is to be performed, the scene selection processing shown in FIG. 8 is performed, while if it is judged it is not to be performed, the EDL preparation processing shown in FIG. 10, discussed later, is performed.

Next, an explanation will be given of the EDL preparation processing.

Figure 10:
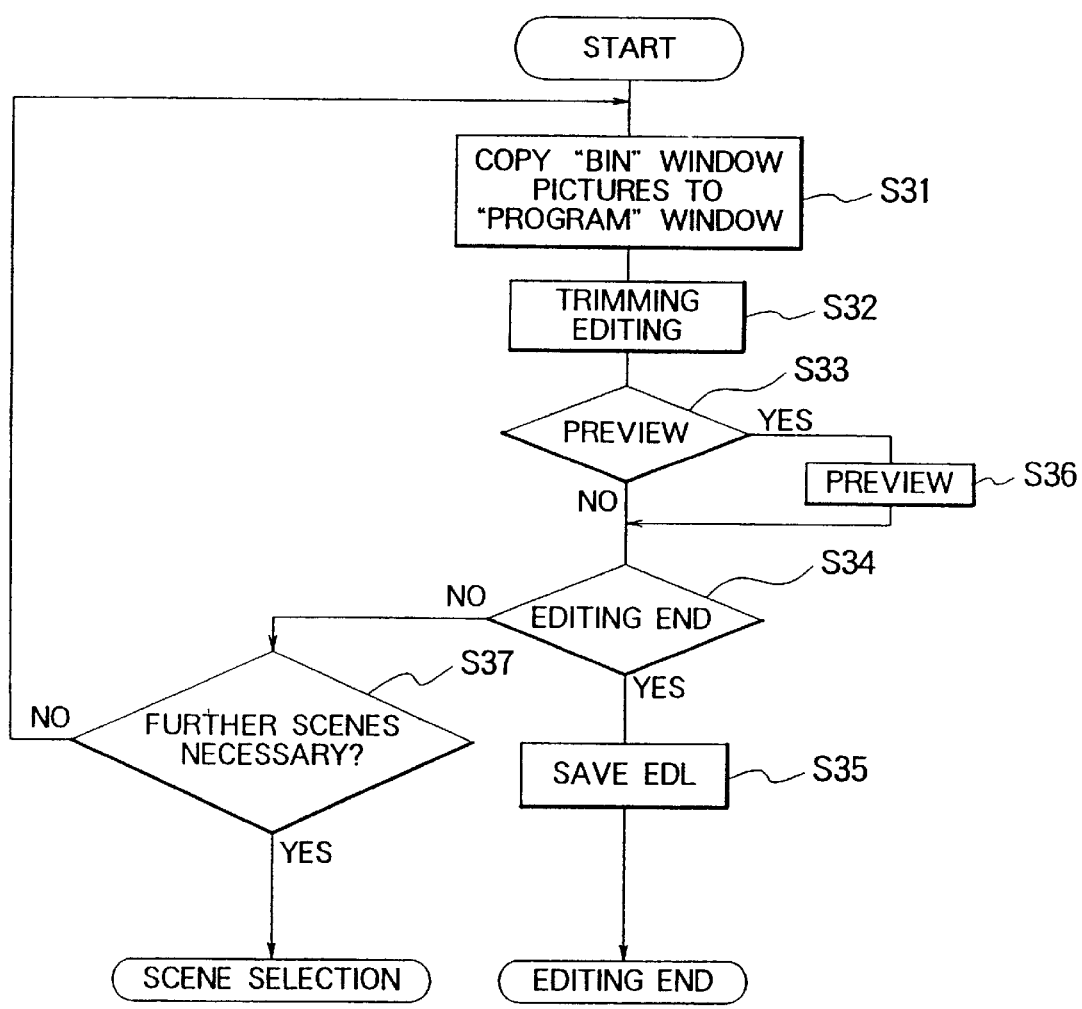
FIG. 10 is a flow chart of the processing for preparation of an EDL in an embodiment of the present invention.

FIG. 10 is a flow chart of the processing for preparation of an EDL.

The processing for preparation of an EDL shown in FIG. 10 corresponds to the on-line editing 64 and off-line editing 68 shown in FIG. 6.

Step S31: The stamp pictures shown in the "Bin" window 73 shown in FIG. 7 are designated using a mouse etc. and the designated stamp pictures are moved or copied to the "Program" window 74 shown in FIG. 7 in units of scenes. Further, the stamp pictures are exchanged between the "Bin" window 73 and the "Program" window 74 or the stamp pictures shown in the "Program" window 74 are deleted.

Step S32: The IN points and OUT points are trimmed so as to leave the necessary display portions of the scene of the stamp pictures shown in the "Program" window 74.

Step S33: It is judged whether or not to conduct a preview. If showing a preview, then the processing is shifted to step S36 for the preview. If not, then the processing of Step S34 is executed.

Step S34: It is judged if the editing is ended or not. When the necessary scenes have all been programmed or edited, it is judged that it has ended and the processing of step S35 is performed. If not, then processing of step S37 is performed.

Step S35: The prepared EDL is saved in the MO disc 6 of the portable AV editing apparatus 1 in the case of off-line processing, while is saved in the hard disc 23 of the hybrid recorder 20 in the case of on-line recording. At this time, the EDL is saved by a predetermined EDL format.

Step S37: Further, it is judged if a scene for programming is necessary. If necessary, then the scene selection processing shown in FIG. 8 is performed once again. When not, the final editing processing shown in FIG. 11 is performed.

Next, an explanation will be given of the final editing processing.

Figure 11:
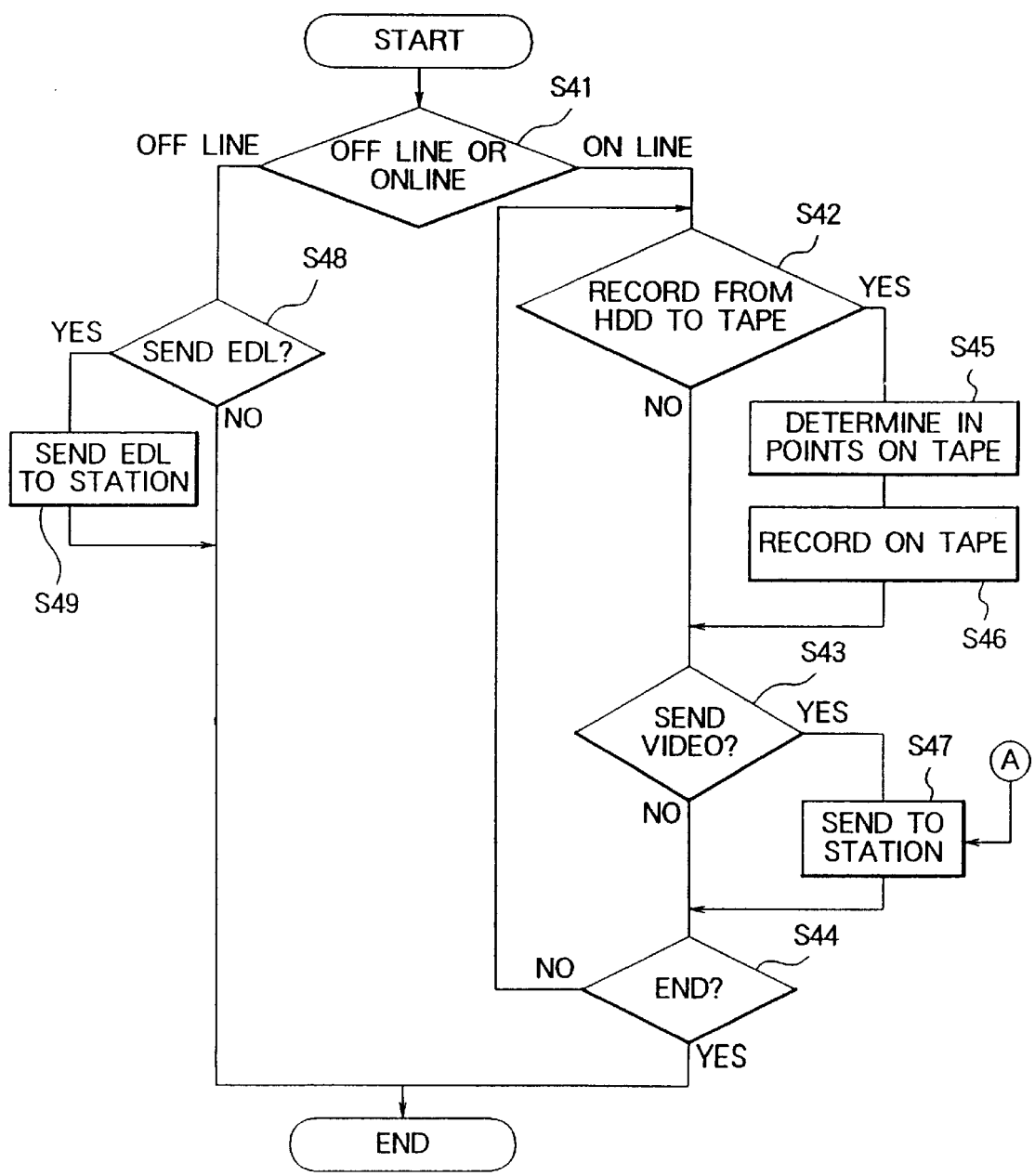
FIG. 11 is a flow chart of the final editing processing in an embodiment of the present invention.

FIG. 11 is a flow chart of the final editing processing.

This final editing processing is performed at the final stage of the flow of events shown in:FIG. 6.

Step S41: In the on-line case, the processing of step S48 is performed, while in the off-line case, the processing of step S42 is performed.

Step S48: This is executed in the off-line case. It is judged if the EDL is to be transmitted. If to be transmitted, the processing of step S49 is performed to transmit the EDL to the broadcasting station. On the other hand, if not, the processing at the field ends.

Step S42: This is executed in the on-line case. It is judged if the complete packet (source) recorded on the hard disc of the hybrid recorder 20 is to be returned to the tape for recording. When to be recorded on the tape, the processing of step S45 is executed. When not, the processing of step S43 is executed.

Step S45: This is executed when returning the complete packet recorded on the hard disc 23 of the hybrid recorder 20 to a tape for recording and determines the IN points on the tape.

Step S46: The complete packet recorded on the hard disc 23 of the hybrid recorder 20 is recorded from the IN point decided on at step S45.

Step S43: It is judged if the video signal is to be transmitted to the broadcasting station or not. If to be transmitted, the processing of step S47 is executed, while if not, the processing of step S44 is performed.

Step S47: The video signal is transmitted to the broadcasting station. Further, the processing of step S47 is executed even when the processing shifts from step S12 shown in FIG. 8 mentioned earlier.

Step S44: It is judged if the processing is finished or not. If not finished, the processing of step S42 is performed again. If finished, the processing at the field is ended.

Below, an explanation will be made of the signal format of the SDDI system.

Figure 12A:
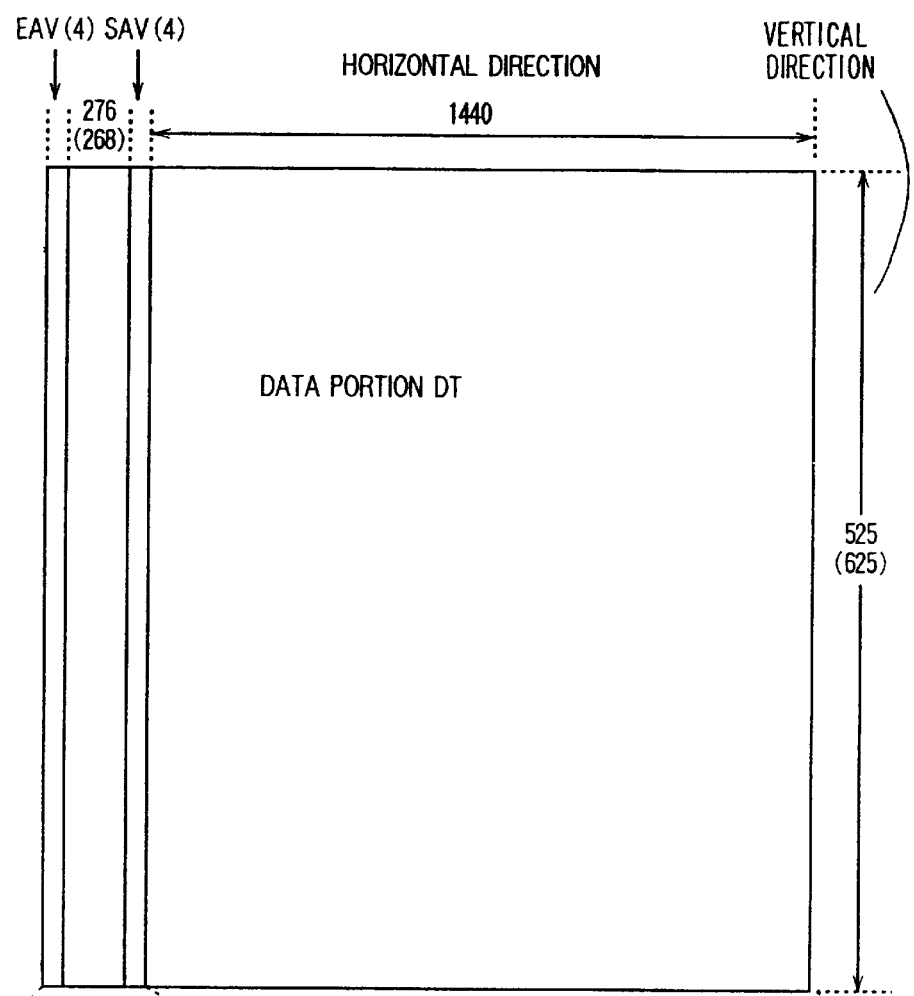
FIG. 12A is a view of the frame configuration of a video signal of the SDDI system.
Figure 12B:
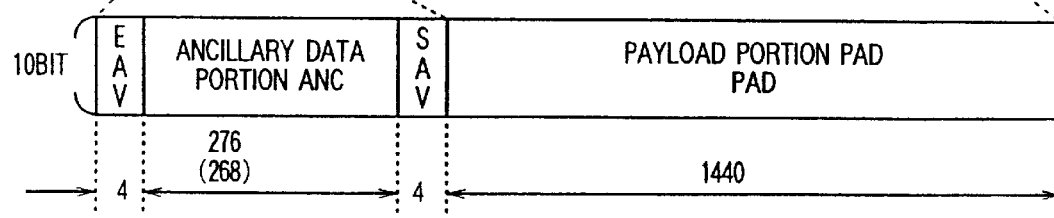
FIG. 12B is a view of the configuration of a transmission packet of the SDDI system.
Figure 12C:
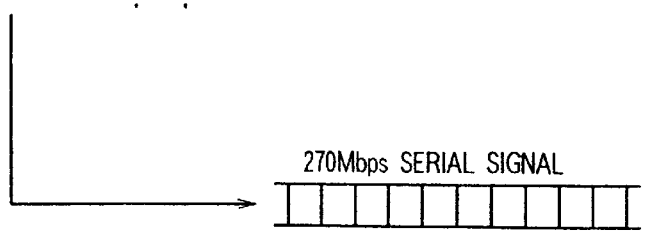
FIG. 12C is a view of the data rate of a video signal of the SDDI system which is transmitted.

FIG. 12A is a view of the frame configuration of a video signal of the SDDI system; FIG. 12B is a view of the configuration of a transmission packet of the SDDI system; and FIG. 12c is a view of the data rate of a video signal of the SDDI system which is transmitted;

As shown in FIG. 12A and FIG. 12B, the lines of the video signal of the SDDI system, like the lines of the video signal of the SDI system, are comprised of 10 bits×1724 (1716) words per line in the horizontal direction and 525 (625) lines in the vertical direction. The SDI system separation codes SAV and EAV, the ancillary data portion ANC, and the active videos $ACV_1$ and $ACV_2$ include the respectively corresponding separation codes SAV and EAV, the ancillary data portion ANC, and the payload portion PAD (data DT).

Further, at the end of the payload portion PAD are added part of the ancillary data portion ANC and a CRC code used for error detection and error correction of the payload portion PAD.

However, as explained later with reference to FIG. 14 and FIGS. 15A to E, a video signal of the SDDI system differs from a video signal of the SDI system in that the ancillary data portion ANC does not include audio data and the payload portion includes audio data and video data.

Note that, as shown in FIG. 12A, the frame of the video signal of the SDDI system does not include portions corresponding to the vertical blanking portion VBK and the optional blanking portion OBK of the SDI video signal.

The video signal of the SDDI system mentioned above, as shown in FIG. 12C, is transmitted and received among the components of the data transmission apparatus 1 converted into a 270 Mbps serial format transmission signal.

FIG. 13A is a view of the configuration of the header data included in the ancillary data portion ANC of the transmission packet of the SDDI system shown in FIG. 12. FIG. 13B shows the position where the header is placed in the ancillary data portion ANC.

As shown in FIG. 13A and FIG. 13B, the header data is comprised of 42 words and is located at the start of the ancillary data portion ANC of the transmission packet of the SDDI system. It includes three words of flags (000h, 3FFh, 3FFh), one word of data ID for each, a block number, data count, data ID code, 16-word addresses (destination addresses) for the same, source addresses, one-word block types for the same, CRC flag, data start position, and check sum data.

Of the above header data, the data ID, block number, data count, data ID code, and check sum are common with the SDI system and constitute a transmission frame the same as with the SDI system, specifically, a frame for transmission of the destination address and the source address.

Of this data, the data ID shows that the data sent from the frame is the destination address and source address, the data ID shows if the transmission packet is a transmission packet of the SDDI system or a transmission packet for SDI, and the check sum is used for error detection by the check sum of the frame data.

The destination address and the source address are data used for identifying the destination apparatus to which the transmission packet is to be sent and the apparatus sending the transmission packet.

The block type shows the configuration of the payload portion PAD.

Specifically, for example, when transmitting fixed length data, it shows if the payload portion PAD is transmitted as the 1440-word block configuration, 719-word 2-block configuration, . . . , 5-word 278 block configuration or if variable length data is transmitted. When the payload portion PAD includes a plurality of data, end codes showing the end of data and start codes showing the start of the next data are inserted between data and only an end code is added to the end of all of the data.

The CRC flag is placed after the payload portion PAD and shows if a CRC code has been added to the payload portion PAD of the transmission frame.

The data start position shows the starting position of the payload portion PAD.

As explained above, the lines of the video signal of the SDI system and the video signal of the SDDI system are the same in the data length, frame configuration, and data transmission rate and, further, by maintaining commonality between the transmission packet of the SDI system and the transmission packet of the SDDI system, it is possible to handle them as the identical data at the portable AV editing apparatus 1 and the hybrid recorder 20.

Figure 14:
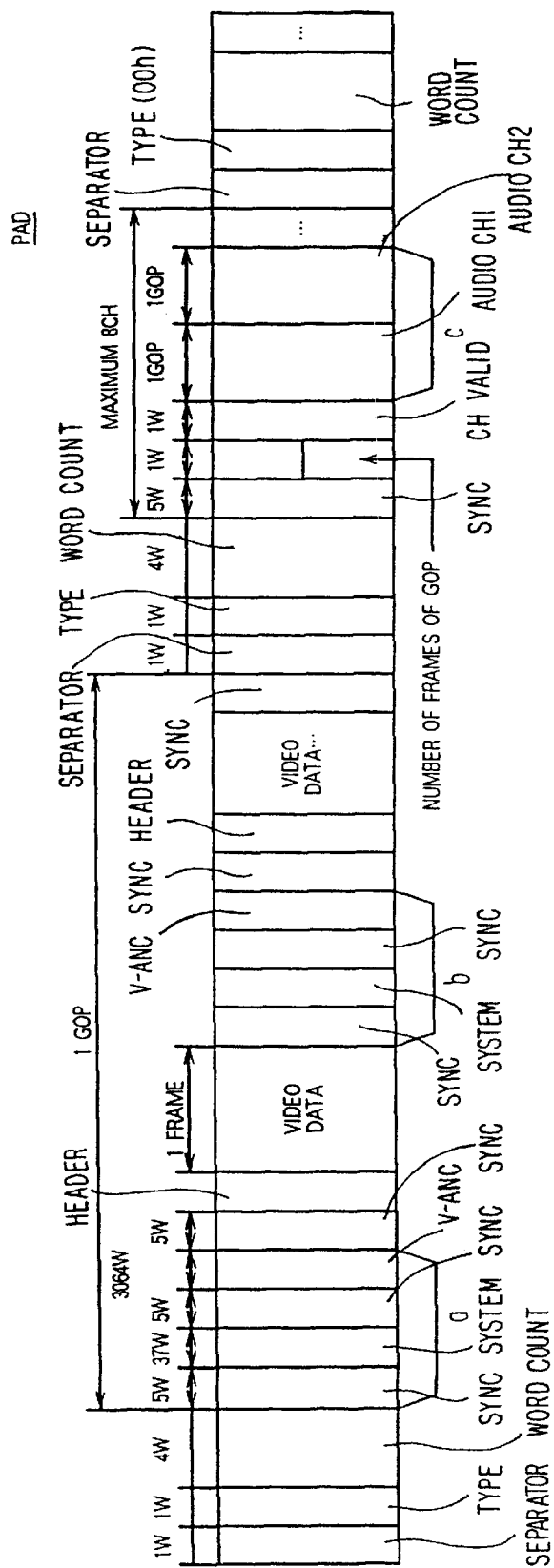
FIG. 14 is a view illustrating the configuration of data of the video signal included in the payload portion PAD of the transmission packet of the SDDI system shown in FIG. 12A, FIG. 12B, and FIG. 12C.

FIG. 14 is a view illustrating the configuration of data of the video signal included in the payload portion PAD of the transmission packet of the SDDI system shown in FIG. 12A, FIG. 12B, and FIG. 12C.

FIGS. 15A to E are views of the data included in the payload portion shown in FIG. 14. FIG. 15A shows the data included in the portions a and b shown in FIG. 14; FIG. 15B shows the data included in the portion a (EXTENSION) shown in FIG. 14A; FIG. 15C shows the data included in the portion c shown in FIG. 14; and FIG. 15D and FIG. 15E show the data included in the portion c (Frame Seq.) of FIG. 15C.

As shown in FIG. 14, a video signal including the payload portion PAD of the transmission packet of the SDDI system includes a separator (SEPARATOR), type (TYPE), word count (WORD COUNT), two systems (SYSTEM), vertical ancillary data portion ANC-V, header (HEADER), video data (VIDEO DATA), number of frames of GOP following the separator, type, word count, channel valid (CH VALID), audio data portion (AUDIO CHn, where n is an integer), etc.

Note that the GOP shows the frames having linkage when performing interframe image compression of the MPEG etc.

The synchronization data (SYNC) shown in FIG. 14 is used for establishing synchronization when reproducing a video signal. In this embodiment, the synchronization signal is used as the synchronization signal in the broadcasting station.

The SEPARATOR is used as the separating signal for separating different parts of the data.

The TYPE shows the type of the data included in the video data. For example, when a video signal included in the video data portion and the audio data portion is compressed, the method of compression (MPEG etc.) and when the video signal is not compressed that fact or when computer data is included in the payload portion that fact is shown.

The WORD COUNT shows the length of the data.

The SYSTEM shows the same content as the attribute data shown in FIG. 15C.

The HEADER is data for compression and for example shows the type of the frame (B/P/I frame etc. in the MPEG system) or the frame number etc.

The data of the portions a and b of FIG. 14 further is of the content shown in FIG. 15A. As the EXTENSION data shown at the portion a of FIG. 15A, the ATTRIBUTE DATA shown in FIG. 15B is included. The ATTRIBUTE DATA includes data identified by the ATTRIBUTE TYPE, for example, the date, author, or supervisor of the video signal and the audio setting data.

In FIG. 15A, the LDC data shows by time a number showing the position of an image on the video tape to be used when performing the editing work, etc. This is recorded at the side of the audio line in the video tape.

The VITC data shows by time a number showing the position of an image on a video tape to be used when performing the editing work etc. This is recorded at the side of the video line in the video tape.

The video index data shows the information regarding the video signal, for example, information on the color frames.

The VANC data shows the data used by the user.

The portion c of FIG. 14 has the content as shown in FIG. 15C. The frames 0 and 1 of the channel (CH1) include the compressed data including the respectively corresponding two series of audio data and showing whether the corresponding audio data has been compressed or not, the channel status, or the channel status (CH Status) showing the sample frequency etc. and frame sequence (Frame seq.) data.

The frame sequence data has the content shown in FIG. 15 when of a 525-line frame configuration and the content shown in FIG. 15E when of a 525-line frame configuration. These data show the number of samples of sound of the frames.

The portable AV editing apparatus of the present invention can be configured in numerous ways in addition to that of the embodiment explained above.

As explained above, according to the present invention, it is possible to perform off-line editing processing without limitation of space and time due to the portability.

Further, according to the portable AV editing apparatus of the present invention, it is possible to perform the operations for the on-line editing processing by connecting with an on-line editing apparatus.

INDUSTRIAL APPLICABILITY

The portable AV editing apparatus of the present invention can be used for AV editing under various circumstances.

What is claimed is:

1. A portable video signal editing apparatus comprising input means for receiving input data from an on-line editing apparatus, recording means for recording data on a disk type random access recording medium, arithmetic and logic means, a display, an input operation unit, and a power source accommodated in a carrying case, said recording means recording on said disk type random access recording medium specifying data which specifies at least a first stamp picture and a last stamp picture of a scene comprised of a plurality of stamp pictures successive in time and to be edited, said specifying data being input by said input means from said on-line editing apparatus when said input means is connected to said on-line editing apparatus, said arithmetic and logic means causing the stamp pictures specified by said specifying data recorded by said recording means to be displayed on said display, said arithmetic and logic means generating editing information showing the editing content based on the option of said input operation unit, said arithmetic and logic means recording said editing information when said input means is not connected to said on-line editing apparatus, whereby said plurality of stamp pictures is determined according to a mode selected from a manual mode and a shuttle mode, said manual mode including picture-by-picture selection according to a user selection dial, and said shuttle mode including automatic selection of pictures according to a preset interval.

2. A portable video signal editing apparatus comprising input means for receiving input data from an on-line editing apparatus, recording means for recording data on a disk type random access recording medium, arithmetic and logic means, a display, an input operation unit, and a power source accommodated in a carrying case, said recording means recording on said disk type random access recording medium video data including a time code input by said input means from said on-line editing apparatus, said arithmetic and logic means generating specifying data which specifies at least a first stamp picture and a last stamp picture of a scene comprised of a plurality of stamp pictures successive in time and to be edited from the video signal recorded by said recording means and recording said specifying data when said input means is not connected to said on-line editing apparatus, said arithmetic and logic means causing the stamp pictures specified by said specifying data recorded by said recording means to be displayed on said display, said arithmetic and logic means generating editing information showing the editing content based on the operation of said input operation unit, said arithmetic and logic means recording said editing information, whereby said plurality of stamp pictures is determined according to a mode selected from a manual mode and a shuttle mode, said manual mode including picture-by-picture selection according to a user selection dial, and said shuttle mode including automatic selection of pictures according to a preset interval.

3. The portable video signal editing apparatus as set forth in claim 1, wherein said input data includes video signals comprised of a plurality of stamp pictures including time code extracted at a predetermined time interval.

4. The portable video signal editing apparatus as set forth in claim 1, wherein said editing information is generated by displaying on said display:

a first display for displaying video signal in blocks of stamp pictures output from said on-line editing apparatus;

a second display for displaying the specified first stamp picture and the specified last stamp picture from the stamp pictures displayed on said second display; and a third display for displaying groups of stamp pictures when programming while designating the stamp pictures displayed on said second displayed by a predetermined operation.

5. The portable video signal editing apparatus as set forth in claim 1, wherein said input operation unit inputs said video signal at least in blocks of fields, said recording means recording said video signal at least in blocks of frames.

6. The portable video signal editing apparatus as set forth in claim 1, wherein said recording means is a magneto-optical disc.

7. The portable video signal editing apparatus as set forth in claim 1, wherein said video signal includes an audio signal.

8. The portable video signal editing apparatus as set forth in claim 2, wherein said input data includes video signals comprised of a plurality of stamp pictures including time code extracted at a predetermined time interval.

9. The portable video signal editing apparatus as set forth in claim 2, wherein said editing information is generated by displaying on said display:

a first display for displaying video signal in blocks of stamp pictures output from said on-line editing apparatus;

a second display for displaying the specified first stamp picture and the specified last stamp picture from the stamp pictures displayed on said second display; and a third display for displaying groups of stamp pictures when programming while designating the stamp pictures displayed on said second displayed by a predetermined operation.

10. The portable video signal editing apparatus as set forth in claim 2, wherein said input operation unit inputs said video signal at least in blocks of fields, said recording means recording said video signal at least in blocks of frames.

11. The portable video signal editing apparatus as set forth in claim 2, wherein said recording means is a magneto-optical disc.

12. The portable video signal editing apparatus as set forth in claim 2, wherein said video signal includes an audio signal.

13. A field editing system for editing source video data in a field, comprising:

a camcorder for recording video data obtained by a video camera on a tape-like recording medium as source video data to be edited;

a recording and reproduction apparatus for accepting the tape-like recording medium and for transferring the source video data recorded on the tape-like recording medium to a random access recording medium at a high speed so as to record the source video data on the random access recording medium;

an editing apparatus based on a general purpose computer for receiving the source video data reproduced from the random access recording medium of the recording and reproduction apparatus in which an editing operator operates said general purpose computer to control the reproduction by said recording and reproduction apparats and to display on a display the source video data reproduced from said random access recording medium and in which the editing operator designates a desired editing point while viewing the video image displayed on the display so as to edit on-line the source video data in the field; and a transmission apparats for transmitting the video data edited on-line by the editing apparatus to a broadcasting station from said field, whereby said source video data recorded on the tape-like recording medium is transferred to said random access recording medium in the form of a plurality of stamp pictures; and whereby said plurality of stamp pictures is determined according to a mode selected from a manual mode and a shuttle mode, said manual mode including picture-by-picture selection according to a user selection dial, and said shuttle mode including automatic selection of pictures according to a preset interval.

14. The field editing system as set forth in claim 13, wherein said recording and reproduction apparatus and said editing apparatus are interfaced so that said video data and audio data corresponding to said video data are transferred in packages based on a predetermined serial transmission format.

15. The field editing system as set forth in claim 14, wherein said serial transmission format is a transmission format which adds a source address indicating a source of transmission of said video data and a destination address indicating the destination of transmission as a header of the packet video data.

16. The field editing system as set forth in claim 15, wherein said transmission apparatus registers information indicating the field as the source address and registers information indicating the broadcasting station as the destination address.

17. The field editing system as set forth in claim 13, wherein said general purpose computer of the editing apparatus is connected to a control station provided with an interface circuit for receiving the video data reproduced from the recording and reproduction apparatus and a controller for controlling the reproduction by said recording and reproduction apparatus so as to receive the video data reproduced from said recording and reproduction apparatus and control the reproduction by said recording and reproduction apparatus.

18. The field editing system as set forth in claim 17, wherein the control station is provided with a battery for supplying power to said general purpose computer.

19. The field editing system as set forth in claim 13, wherein said general purpose computer of said editing apparatus is programmed to display on the display a viewer window displaying as a moving image a video image showing the video data reproduced from the recording and reproduction apparatus and a program window displaying a stamp picture showing the editing point registered by the editing operator.

20. The field editing system as set forth in claim 13, wherein said editing apparatus is provided with, in addition to the on-line editing function, another on-line editing function which compresses the source video data so that the amount of data becomes smaller than the source video data recorded on said random access recording medium of said recording and reproduction apparatus, said another on-line editing function recording the above compressed source video data on another random access recording medium different from said random access recording medium of said recording and reproduction apparatus, and said another on-line editing function using the compressed source video data recorded on said another random access recording medium to generate an edit decision list showing the editing point of the source video data to enable editing of the source video data on-line.

21. The field editing system as set forth in claim 20, wherein said compressed video data recorded on said an other random access recording medium is compressed using the JPEG system.

22. A field editing system for editing source video data in a field, comprising:

recording means for recording video data captured by a video camera on a recording medium as source video data to be edited;

reproducing means for reproducing the source video data recorded on the recording medium; and editing means which is connected to said reproducing means so as to receive the source video data reproduced by said reproducing means from said recording medium, said editing means using the source video data reproduced by said reproducing means during the reproduction to automatically display a plurality of stamp pictures for selecting the desired scene, and, after the reproduction of the source video data, using the plurality of stamp pictures displayed on the display to edit the source video data in the field, whereby said plurality of stamp pictures is determined according to a mode selected from a manual mode and a shuttle mode, said manual mode including picture-by-picture selection according to a user selection dial, and said shuttle node including automatic selection of pictures according to a preset interval.

23. The field editing system as set forth in claim 22, wherein said editing means is provided with a general purpose computer which is programmed to display on the display the source video data reproduced from said reproducing means as a moving image and to display on the display the plurality of stamp pictures as a stationary image.

24. The field editing system as set forth in claim 23, further comprising transmission means for transmitting the video data editing by said editing means from the field to a broadcasting station.

25. The field editing system as set forth in claim 24, wherein said reproducing means and said editing means are interfaced so that the video data and the audio data corresponding to the video data are transferred in packages based on a predetermined serial transmission format.

26. The field editing system as set forth in claim 25, wherein said serial transmission format is a transmission format which adds a source address indicating a source of transmission of said video data and a destination address indicating the destination of transmission as a header of the packet video data.

27. The field editing system as set forth in claim 21, wherein said transmission apparatus registers information showing the field as the source address and registers information showing the broadcasting station as the destination address.

28. An editing method for editing source video data, said editing method comprising the steps of:
    recording said source video data on a first recording medium;
    compressing the source video data recorded on said first recording medium and recording the compressed source video data on a second random access recording medium; and
    using the compressed source video data recorded on said second random access recording medium to generate an edit decision list showing an editing point of the source video data so as to enable on-line editing of the source video data recorded on said first recording medium in a field,
    whereby said source video data recorded on said first recording medium is recorded in the form of a plurality of stamp pictures; and
    whereby said plurality of stamp pictures is determined according to a mode selected from a manual mode and a shuttle mode, said manual mode including picture-by-picture selection according to a user selection dial, and said shuttle mode including automatic selection of pictures according to a preset interval.

29. The editing method as set forth in claim 28, wherein said edit decision list is transmitted from the field to a broadcasting station and the edit decision list is used for editing the source video data for performing on-line editing.

30. The editing method as set forth in claim 28, wherein the compressed video data recorded on said second random access recording medium is compressed using the JPEG system.

31. The editing method as set forth in claim 28, when performing on-line editing of the source video data, further comprising the steps of recording the source video data on said second random access recording medium, reproducing the source video data from said second random access recording medium, displaying the source video data reproduced from said second random access recording medium on the display of a computer, and having an editing operator designate a desired editing point while viewing the video image displayed on the display so as to edit on-line the source video data in the field.

32. An editing system using video production apparatus including a video camera, a recording and reproduction apparatus, and editing apparatus for editing source video obtained by the video camera, said editing system comprising:
    on-line editing means for performing on-line editing on the source video data; and
    off-line editing means for performing off-line editing on the source video data, said on-line editing means recording the source video data on a first random access recording medium provided at said recording and reproduction apparatus and controlling said recording and reproduction apparatus so as to reproduce the source video data from said first random access recording medium and displaying the source video data reproduced from said first random access recording medium on the display of a computer and having an editing operator designate a desired editing point while viewing the video image displayed on the display so as to edit on-line the source video data in the field; said off-line editing means compressing the source video data so that the amount of data becomes smaller than the source video data recorded on said first random access recording medium, recording the compressed source video data on a second random access recording medium different from said first random access recording medium, and using the compressed source video data recorded on said second random access recording medium to generate an edit decision list showing an editing point of the source video data so as to enable off-line editing of the source video data recorded on said first random access recording medium,
    whereby said source video data recorded on said first random access recording medium is recorded in the form of a plurality of stamp pictures; and
    whereby said plurality of stamp pictures is determined according to a mode selected from a manual mode and a shuttle mode, said manual mode including picture-by-picture selection according to a user selection dial, and said shuttle mode including automatic selection of pictures according to a preset interval.

33. The editing system as set forth in claim 32, further comprising:
    first transmitting means for transmitting video data edited by said on-line editing means to a broadcasting station; and
    second transmitting means for transmitting the edit decision list generated by said off-line editing means to the broadcasting station.

34. The editing system as set forth in claim 32, wherein said recording and reproduction apparatus and said editing apparatus are interfaced so that the video data and audio data corresponding to said video data are transferred in packages based on a predetermined serial transmission format.

35. The editing system as set forth in claim 32, wherein said serial transmission format is a transmission format which adds a source address indicating a source of transmission of said video data and a destination address indicating the destination of transmission as a header of the packet video data.

36. The editing system as set forth in claim 35, wherein said first transmitting means registers information showing the field where the video production was performed as the source address and registers information showing the broadcasting station as the destination address.

37. The editing system as set forth in claim 32, wherein said editing apparatus is based on a general purpose portable computer and said portable computer is programmed to display on the display a viewer window displaying as a moving image a video image showing the video data reproduced from said recording and reproduction apparatus and a program window displaying a stamp picture showing the editing point registered by the editing operator.

38. An editing method for using a video production system comprised of a video camera, recording and reproduction apparatus, and a computer to perform on-line editing or off-line editing on source data obtained by the video camera, said editing method comprising the steps of:

when performing on-line editing on the source video data, recording the source video data on a first random access recording medium provided at said recording and reproduction apparatus and controlling said recording and reproduction apparatus so as to reproduce the source video data from said first random access recording medium; and displaying the source video data reproduced from said first random access recording medium on the display of said computer and having an editing operator designate a desired editing point while viewing the video image displayed on the display so as to edit on-line the source video data in the field;

when performing off-line editing on the source video data, compressing the source video data so that the amount of data becomes smaller than the source video data recorded on said first random access recording medium;

recording the compressed source video data on a second random access recording medium different from said first random access recording medium; and using the compressed source video data recorded on said second random access recording medium to generate an edit decision list showing an editing point of the source video data so as to enable off-line editing of the source video data recorded on said first random access recording medium, whereby said source video data recorded on said first random access recording medium is recorded in the form of a plurality of stamp pictures; and whereby said plurality of stamp pictures is determined according to a mode selected from a manual mode and a shuttle mode, said manual mode including picture-by-picture selection according to a user selection dial, and said shuttle mode including automatic selection of pictures according to a preset interval.

39. A portable video signal editing apparatus comprising input means for receiving input data from an on-line editing apparatus, recording means for recording data on a disk type random access recording medium, arithmetic and logic means, a display, an input operation unit, and a power source accommodated in a carrying case, said recording means recording on said disk type random access recording medium specifying data which specifies at least a first stamp picture and a last stamp picture of a scene comprised of a plurality of stamp pictures successive in time and to be edited, said specifying data being input by said input means from said on-line editing apparatus when said input means is connected to said on-line editing apparatus, said arithmetic and logic means causing the stamp pictures specified by said specifying data recorded by said recording means to be displayed on said display, said arithmetic and logic means generating editing information showing the editing content based on the operation of said input operation unit, said arithmetic and logic means recording said editing information when said input means is not connected to said on-line editing apparatus, wherein said editing information is generated by displaying on said display a first display for displaying video signal in blocks of stamp pictures output from said on-line editing apparatus, a second display for displaying the specified first stamp picture and the specified last stamp picture from the stamp pictures displayed on said second display, and a third display for displaying groups of stamp pictures when programming while designating the stamp pictures displayed on said second displayed by a predetermined operation.

40. A portable video signal editing apparatus comprising input means for receiving input data from an on-line editing apparatus, recording means for recording data on a disk type random access recording medium, arithmetic and logic means, a display, an input operation unit, and a power source accommodated in a carrying case, said recording means recording on said disk type random access recording medium video data including a time code input by said input means from said on-line editing apparatus, said arithmetic and logic means generating specifying data which specifies at least a first stamp picture and a last stamp picture of a scene comprised of a plurality of stamp pictures successive in time and to be edited from the video signal recorded by said recording means and recording said specifying data when said input means is not connected to said on-line editing apparatus, said arithmetic and logic means causing the stamp pictures specified by said specifying data recorded by said recording means to be displayed on said display, said arithmetic and logic means generating editing information showing the editing content based on the operation of said input operation unit, said arithmetic and logic means recording said editing information, wherein said editing information is generated by displaying on said display a first display for displaying video signal in blocks of stamp pictures output from said on-line editing apparatus, a second display for displaying the specified first stamp picture and the specified last stamp picture from the stamp pictures displayed on said second display, and a third display for displaying groups of stamp pictures when programming while designating the stamp pictures displayed on said second displayed by a predetermined operation.

* * * * *